United States Patent
Liu et al.

(10) Patent No.: US 12,480,979 B2
(45) Date of Patent: Nov. 25, 2025

(54) CURRENT DETECTION CIRCUIT AND ELECTRONIC DEVICE

(71) Applicant: Halo Microelectronics Co., Ltd, Foshan (CN)

(72) Inventors: Dongming Liu, Foshan (CN); Xiaoliang Tan, Foshan (CN)

(73) Assignee: Halo Microelectronics Co., Ltd., Foshan (CN)

( * ) Notice: Subject to any disclaimer, the term of this patent is extended or adjusted under 35 U.S.C. 154(b) by 197 days.

(21) Appl. No.: 18/375,935

(22) Filed: Oct. 2, 2023

(65) Prior Publication Data

US 2024/0402222 A1 Dec. 5, 2024

(30) Foreign Application Priority Data

Jun. 2, 2023 (CN) .......................... 202310644243.8

(51) Int. Cl.
  *G01R 19/10* (2006.01)
  *G01R 35/00* (2006.01)

(52) U.S. Cl.
  CPC ........... *G01R 19/10* (2013.01); *G01R 35/005* (2013.01)

(58) Field of Classification Search
  CPC ...... G01R 19/10; G01R 35/005; G01R 19/00; G01R 19/0092; G01R 19/16571
  See application file for complete search history.

(56) References Cited

U.S. PATENT DOCUMENTS

| | | | |
|---|---|---|---|
| 6,621,333 B1 * | 9/2003 | Chen ..................... | H03F 3/3008 330/265 |
| 11,579,203 B1 * | 2/2023 | Tan ..................... | G01R 31/3842 |

(Continued)

FOREIGN PATENT DOCUMENTS

| | | |
|---|---|---|
| CN | 101029910 A | 9/2007 |
| CN | 108153364 A | 6/2018 |

(Continued)

OTHER PUBLICATIONS

Dongming, Liu, et al., "Effect of Band Trap Band Current on DCIV Spectrum Peaks at LDD Drain Region in 0.275m nMOST's", Chinese Journal of Semiconductors, vol. 24, No. 2, Feb. 2003.

(Continued)

*Primary Examiner* — Akm Zakaria
(74) *Attorney, Agent, or Firm* — AP3 Law Firm PLLC

(57) ABSTRACT

A current detection circuit comprises a signal input terminal, a signal output terminal, a switch branch, a first current detection branch, and a second current detection branch. The switch branch is configured to block the current flowing from the signal output terminal to the signal input terminal when the switch branch is turned off. When the switch branch is conducting, the current flowing from the signal input terminal through the switch branch to the signal output terminal is the switch branch current comprising a first part linearly related to a first voltage difference, and a second part exponentially related to the first voltage difference. The first voltage difference is the voltage difference between the signal input terminal and the signal output terminal. The first current detection branch outputs a first detection current representing the first part. The second current detection branch outputs a second detection current representing the second part.

19 Claims, 13 Drawing Sheets

(56) References Cited

U.S. PATENT DOCUMENTS

| | | | |
|---|---|---|---|
| 11,968,503 B2* | 4/2024 | Yang | H04R 3/007 |
| 2014/0350871 A1 | 11/2014 | Krefta | |
| 2017/0053590 A1 | 2/2017 | Song et al. | |
| 2017/0093390 A1 | 3/2017 | Tsurumaru et al. | |
| 2017/0141676 A1 | 5/2017 | Gerna et al. | |
| 2018/0196457 A1* | 7/2018 | Arai | H03F 1/086 |
| 2020/0150154 A1* | 5/2020 | Chang | H02M 3/33592 |
| 2021/0067153 A1 | 3/2021 | Majima | |
| 2022/0038088 A1* | 2/2022 | Otsu | H03K 17/08122 |
| 2022/0357370 A1* | 11/2022 | Zhang | G01R 19/16552 |
| 2023/0028330 A1* | 1/2023 | Wang | G01R 19/0092 |

FOREIGN PATENT DOCUMENTS

| | | | |
|---|---|---|---|
| CN | 113219233 A | 8/2021 | |
| EP | 1046919 A2 | 10/2000 | |
| JP | 2001356139 A | 12/2001 | |

OTHER PUBLICATIONS

Jiang, Guoqiang, "Digital Logic Circuits", May 2020, p. 48.
Search Report received in Chinese Application No. 2023106442438, dated Jun. 20, 2023, 4 pages.
She, Hongwu, et al., "Output Voltage Compensation Method of Matrix Converter Based on Voltage-Based Commutation", Proceedings of the Chinese Society for Electrical Engineering, vol. 31, No. 3, Jan. 25, 2011.

* cited by examiner

CURRENT DETECTION CIRCUIT AND ELECTRONIC DEVICE

RELATED APPLICATION

This application claims the benefit of and priority to Chinese Patent Application No. 2023106442438, filed on Jun. 2, 2023, which is hereby incorporated by reference in its entirety.

TECHNICAL FIELD

This application relates to the field of electronic circuit technology, particularly involving a current detection circuit and electronic device.

BACKGROUND

With the development of automotive electrification and intelligence, automotive chips are increasingly integrating monitoring, diagnosis, and protection functions. Power supply chips in automotive chips need to monitor the status of the load terminal and diagnose abnormal conditions at the load terminal.

For example, by monitoring the current at the load terminal, power supply chips can determine whether there is an overcurrent abnormal state at the load terminal. Furthermore, they can also cut off the power supply to the load terminal when the overcurrent abnormal state occurs to prevent the load from being damaged. Therefore, in order to protect the load in a timely manner, it is particularly important to accurately detect the current at the load terminal.

SUMMARY

This application aims to provide a current detection circuit and electronic device that can accurately detect the current flowing through a load.

To achieve the above objectives, in a first aspect, this application provides a current detection circuit comprising a signal input terminal, a signal output terminal, a switch branch, a first current detection branch, and a second current detection branch. The switch branch and the first current detection branch are both connected between the signal input terminal and the signal output terminal, and the second current detection branch is connected to the signal input terminal and the first current detection branch. The switch branch is configured to block the current flowing from the signal output terminal to the signal input terminal when the switch branch is turned off. When the switch branch is turned on, the current flowing from the signal input terminal through the switch branch to the signal output terminal is the switch branch current comprising a first current linearly related to the first voltage difference and a second current exponentially related to the first voltage difference, where a first voltage difference is the voltage difference between the signal input terminal and the signal output terminal.

The first current detection branch is configured to output a first detection current representing the first current. The second current detection branch is configured to output a second detection current representing the second current.

In an optional embodiment, the current detection circuit further includes a summation branch. The summation branch is connected to the first current detection branch and the second current detection branch and is configured to output a third detection current based on the first detection current and the second detection current, where the third detection current is 1/K times the switch branch current, and K>1.

In an optional embodiment, the first detection current is equal to 1/K of the first current.

In an optional embodiment, the first current detection branch comprises a first transistor, a first amplifier, and a second transistor. The first transistor is connected to the signal input terminal, the first amplifier and the switch branch. The first transistor is configured such that the equivalent internal resistance of the first transistor is K times the equivalent internal resistance of the switch branch.

The first amplifier is also connected to the first transistor, the second transistor, and the signal output terminal. The combination of the first amplifier and the second transistor is configured to maintain the voltage at the common terminal of the first transistor and the first amplifier equal to the voltage at the signal output terminal, such that the current flowing through the channel of the first transistor is the first detection current.

Alternatively, the first current detection branch comprises a first resistor, a first amplifier, and a second transistor. The first resistor is connected to the signal input terminal and the first amplifier. The first resistor is configured such that the resistance value of the first resistor is K times the equivalent internal resistance of the switch branch. The combination of the first amplifier and the second transistor is configured to maintain the voltage at the common terminal of the first resistor and the first amplifier equal to the voltage at the signal output terminal, such that the current flowing through the first resistor is the first detection current.

In an optional embodiment, the second input terminal of the first amplifier is connected to the signal output terminal. The output terminal of the first amplifier is connected to the first terminal of the second transistor, and the second terminal of the second transistor is used to output the first detection current. When the first current detection branch comprises the first transistor, the first terminal of the first transistor is connected to the switch branch. The third terminal of the first transistor is connected to the signal input terminal, and the second terminal of the first transistor is connected to the first input terminal of the first amplifier and the third terminal of the second transistor. When the first current detection branch comprises the first resistor, the first terminal of the first resistor is connected to the first input terminal of the first amplifier and the third terminal of the second transistor, and the second terminal of the first resistor is connected to the signal input terminal.

In an optional configuration, when the first current detection branch comprises the first resistor, the first current detection branch also comprises a second resistor for temperature compensation, a third transistor, a second amplifier, a fourth transistor, and a current mirror unit.

The first terminal of the second resistor is connected to the second terminal of the second transistor and the first input terminal of the second amplifier. The second input terminal of the second amplifier is connected to the second terminal of the third transistor and the second terminal of the fourth transistor. The output terminal of the second amplifier is connected to the first terminal of the fourth transistor. The second terminal of the second resistor and the third terminal of the third transistor are both grounded. The third terminal of the fourth transistor is connected to the first terminal of the current mirror unit, and the second terminal of the current mirror unit is used to output the first detection current.

In another optional configuration, the first current detection branch comprises a fifth transistor, a third amplifier, a sixth transistor, and a first calibration unit. The fifth transistor is connected to the signal input terminal, the third amplifier, and the switching branch. The third amplifier is also connected to the fifth transistor, the sixth transistor, and the signal output terminal. The combination of the third amplifier and the sixth transistor is configured to maintain the voltage at the common terminal of the fifth transistor and the third amplifier equal to the voltage at the signal output terminal, so that the current flowing through the channel of the fifth transistor is linearly related to the first current. The first calibration unit is connected to the sixth transistor and is configured to calibrate the current flowing through the sixth transistor to output the first detection current.

Alternatively, the first current detection branch comprises a third resistor, a third amplifier, a sixth transistor, and a first calibration unit. The third resistor is connected to the signal input terminal and the third amplifier. The combination of the third amplifier and the sixth transistor is configured to maintain the voltage at the common terminal of the third resistor and the third amplifier equal to the voltage at the signal output terminal, so that the current flowing through the third resistor is linearly related to the first current. The first calibration unit is connected to the sixth transistor and is configured to calibrate the current flowing through the sixth transistor to output the first detection current.

In an optional configuration, the second input terminal of the third amplifier is connected to the signal output terminal. The output terminal of the third amplifier is connected to the first terminal of the sixth transistor. The second terminal of the sixth transistor is connected to the first terminal of the first calibration unit, and the second terminal of the first calibration unit is used to output the first detection current. When the first current detection branch comprises the fifth transistor, the first terminal of the fifth transistor is connected to the switching branch. The third terminal of the fifth transistor is connected to the signal input terminal. The second terminal of the fifth transistor is connected to the first input terminal of the third amplifier and the third terminal of the sixth transistor. When the first current detection branch comprises the third resistor, the first terminal of the third resistor is connected to the first input terminal of the third amplifier and the third terminal of the sixth transistor. The second terminal of the third resistor is connected to the signal input terminal.

In an optional configuration, the first current detection branch also comprises a compensation resistor. The first terminal of the compensation resistor is connected to the signal output terminal. The second terminal of the compensation resistor is connected to the second input terminal of the third amplifier and the third terminal of the first calibration unit.

The compensation resistor is configured such that the voltage-drop across the compensation resistor formed by the current output from the third terminal of the first calibration unit is equal to the voltage-drop across a resistor on the first connection line, where the first connection line is the connection line between the switching branch and the signal output terminal.

In an optional configuration, the second detection current is equal to 1/K times the second current.

In an optional configuration, the second current detection branch comprises a seventh transistor, which is connected to the signal input terminal and is configured such that the body diode of the seventh transistor and the body diode in the switching branch have the same structure, a fourth amplifier and an eighth transistor, where the fourth amplifier is connected to the seventh transistor, the eighth transistor, and the signal output terminal. The combination of the fourth amplifier and the eighth transistor is configured to maintain the voltage at the common terminal of the fourth amplifier and the seventh transistor equal to the voltage at the signal output terminal, so that the current flowing through the body diode of the seventh transistor is the second detection current.

In an optional configuration, the first terminal of the seventh transistor is connected to the second terminal of the seventh transistor, the first input terminal of the fourth amplifier, and the third terminal of the eighth transistor. The third terminal of the seventh transistor is connected to the signal input terminal. The second input terminal of the fourth amplifier is connected to the signal output terminal. The output terminal of the fourth amplifier is connected to the first terminal of the eighth transistor. The second terminal of the eighth transistor is used to output the second detection current.

In an optional configuration, the second current detection branch comprises a ninth transistor, which is connected to the signal input terminal and is configured such that the body diode of the ninth transistor and the body diode in the switching branch have the same structure, a fifth amplifier and a tenth transistor, where the fifth amplifier is connected to the ninth transistor, the tenth transistor, and the signal output terminal. The combination of the fifth amplifier and the tenth transistor is configured to maintain the voltage at the common terminal of the fifth amplifier connected and the ninth transistor equal to the voltage at the signal output terminal, so that the current flowing through the body diode of the ninth transistor is linearly related to the second current, a second calibration unit, which is connected to the tenth transistor and is configured to calibrate the current flowing through the tenth transistor to output the second detection current.

In an optional configuration, the first terminal of the ninth transistor is connected to the second terminal of the ninth transistor. The second terminal of the ninth transistor is connected to the first input terminal of the fifth amplifier and the third terminal of the tenth transistor. The second input terminal of the fifth amplifier is connected to the signal output terminal. The output terminal of the fifth amplifier is connected to the first terminal of the tenth transistor. The second terminal of the tenth transistor is connected to the first terminal of the second calibration unit, and the second terminal of the second calibration unit is used to output the second detection current.

In an optional configuration, the first current detection branch comprises the eleventh transistor, the twelfth transistor, and the sixth amplifier. The eleventh transistor is connected to the signal input terminal, the sixth amplifier and the switching branch. The eleventh transistor is configured such that the equivalent resistance of the eleventh transistor is K times the equivalent resistance of the switching branch.

The sixth amplifier is also connected to the eleventh transistor, the twelfth transistor and the signal output terminal. The combination of the sixth amplifier and the twelfth transistor is configured to maintain the voltage at the common terminal of the sixth amplifier and the eleventh transistor equal to the voltage at the signal output terminal, so that the current flowing through the channel of the eleventh transistor is 1/K times the first current.

In an optional configuration, the first terminal of the eleventh transistor is connected to the switching branch. The second terminal of the eleventh transistor is connected to the first input terminal of the sixth amplifier and the third terminal of the twelfth transistor. The third terminal of the eleventh transistor is connected to the signal input terminal.

In an optional configuration, the second current detection branch comprises the thirteenth transistor. The first terminal of the thirteenth transistor is connected to the second terminal of the thirteenth transistor and the first current detection branch. The third terminal of the thirteenth transistor is connected to the signal input terminal. The current flowing through the body diode of the thirteenth transistor is the second detection current, and the second detection current plus the current flowing through the body diode of the eleventh transistor is equal to 1/K times the second current.

In an optional configuration, the current flowing through the twelfth transistor is 1/K times the current flowing through the switching branch.

In an optional configuration, the switching branch comprises the fourteenth transistor. The second terminal of the fourteenth transistor and the cathode of the body diode in the fourteenth transistor are both connected to the signal output terminal. The third terminal of the fourteenth transistor and the anode of the body diode in the fourteenth transistor are both connected to the signal input terminal. The first current is the current flowing through the channel of the fourteenth transistor, and the second current is the current flowing through the body diode of the fourteenth transistor.

Secondly, the present application provides an electronic device that comprises the current detection circuit as described above.

The advantageous effect of the present application is that the current detection circuit provided comprises a signal input terminal, a signal output terminal, a switching branch, a first current detection branch, and a second current detection branch. The switching branch and the first current detection branch are both connected between the signal input terminal and the signal output terminal, and the second current detection branch is connected to the signal input terminal and the first current detection branch. The switching branch is configured to block the current flowing from the signal output terminal to the signal input terminal when the switching branch is turned off. When the switching branch is conducting, the current flowing from the signal input terminal through the switching branch to the signal output terminal is the switching branch current, which comprises a first current linearly related to the first voltage difference and a second current exponentially related to the first voltage difference, where the first voltage difference is the voltage difference between the signal input terminal and the signal output terminal. The first current detection branch is configured to output a first detection current that represents the first current. The second current detection branch is configured to output a second detection current that represents the second current. Based on the first detection current and the second detection current, the detection of the switching branch current, which is the current flowing through the load, can be achieved, thereby accurately detecting the current flowing through the load.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

One or more embodiments are exemplarily described with reference to the accompanying drawings, which are not intended to limit the embodiments. Elements in the drawings with the same reference numerals represent similar elements unless otherwise specified. The drawings are not to scale.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In order to provide a clearer and more complete description of the objectives, technical solutions, and advantages of the embodiments described in this application, the following description, in conjunction with the accompanying drawings, will be used to describe the technical solutions in the embodiments of this application. It is evident that the described embodiments are part of the embodiments disclosed in this application, rather than the entirety of the embodiments. Based on the embodiments disclosed in this application, all other embodiments that ordinary skilled artisans can obtain without exercising inventive labor are within the scope of protection of this application.

Figure 1:
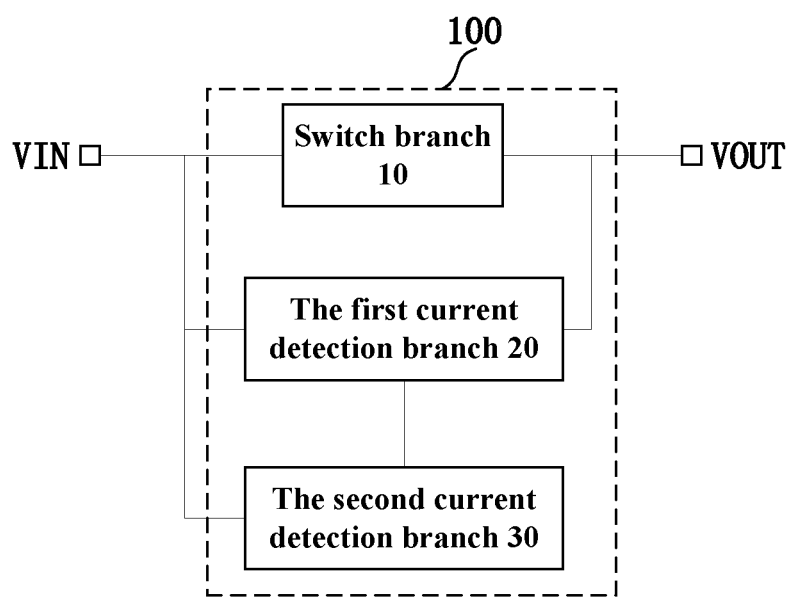
FIG. 1 illustrates a schematic diagram of the structure of a current detection circuit provided in one embodiment of the present application.

Please refer to FIG. 1, which illustrates a schematic diagram of the structure of a current detection circuit 100 provided in one embodiment of this application. As shown in FIG. 1, the current detection circuit 100 comprises a signal input terminal VIN, a signal output terminal VOUT, a switch branch 10, a first current detection branch 20, and a second current detection branch 30.

The switch branch 10 and the first current detection branch 20 are both connected between the signal input terminal VIN and the signal output terminal VOUT, while the second current detection branch 30 is connected to the signal input terminal VIN and the first current detection branch 20.

Specifically, the switch branch 10 is configured to block the current flowing from the signal output terminal VOUT to the signal input terminal VIN when the switch branch 10 is turned off. When the switch branch 10 is conducting, the current flowing from the signal input terminal VIN through the switch branch 10 to the signal output terminal VOUT is the switch branch current. The switch branch current comprises a first part of current that is linearly related to the first voltage difference, and a second part of current that is exponentially related to a first voltage difference, where the first voltage difference is the voltage difference between the signal input terminal VIN and the signal output terminal VOUT. The first current detection branch 20 is configured to output a first detection current I1 that represents the first part of the switch branch current, while the second current detection branch 30 is configured to output a second detection current I2 that represents the second part of the switch branch current.

Through the above approach, the switch branch current is divided into two different parts, and these two parts of current are processed separately to obtain the first detection current I1 and the second detection current I2. Finally, based on the first detection current I1 and the second detection current I2, the detection of the switch branch current, which corresponds to the detection of the current flowing into the load, can be accurately achieved.

Figure 2:
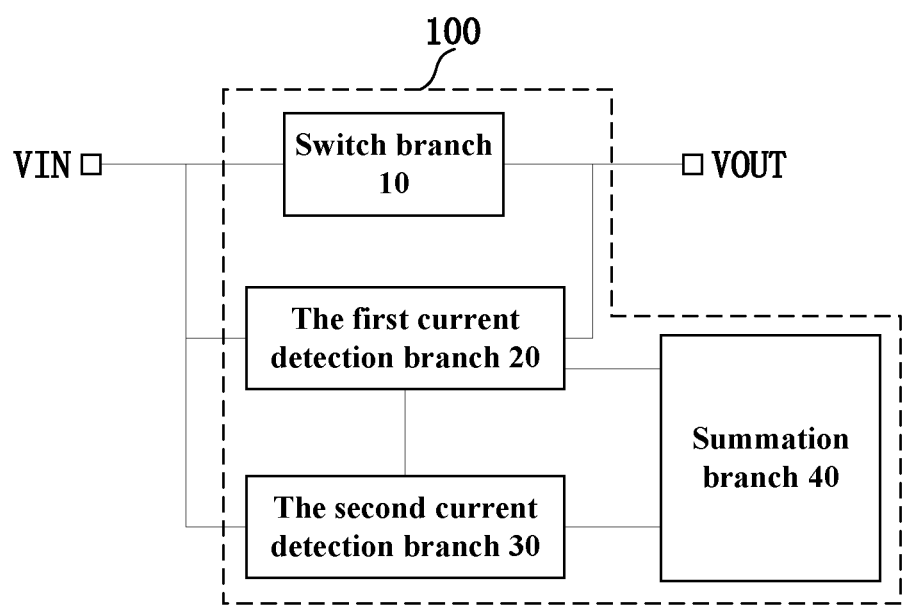
FIG. 2 illustrates a schematic diagram of the structure of a current detection circuit provided in another embodiment of the present application.

In one embodiment, as shown in FIG. 2, the current detection circuit 100 further comprises a summation branch 40. The summation branch 40 is connected to both the first current detection branch 20 and the second current detection branch 30. The summation branch 40 is configured to output a third detection current based on the first detection current I1 and the second detection current I2. The third detection current is equal to 1/K times the switch branch current, where K>1.

In some embodiments, the third detection current is obtained by summing the first detection current I1 and the second detection current I2. By using the third detection current, the magnitude of the switch branch current can be determined. It should be noted that the summation branch 40 may not only simply add the first detection current I1 and the second detection current I2, but also comprise a linear transformation of the first detection current I1 and the second detection current I2 before summing them to maintain a proportional relationship of 1/K between the third detection current and the switch branch current.

Figure 3:
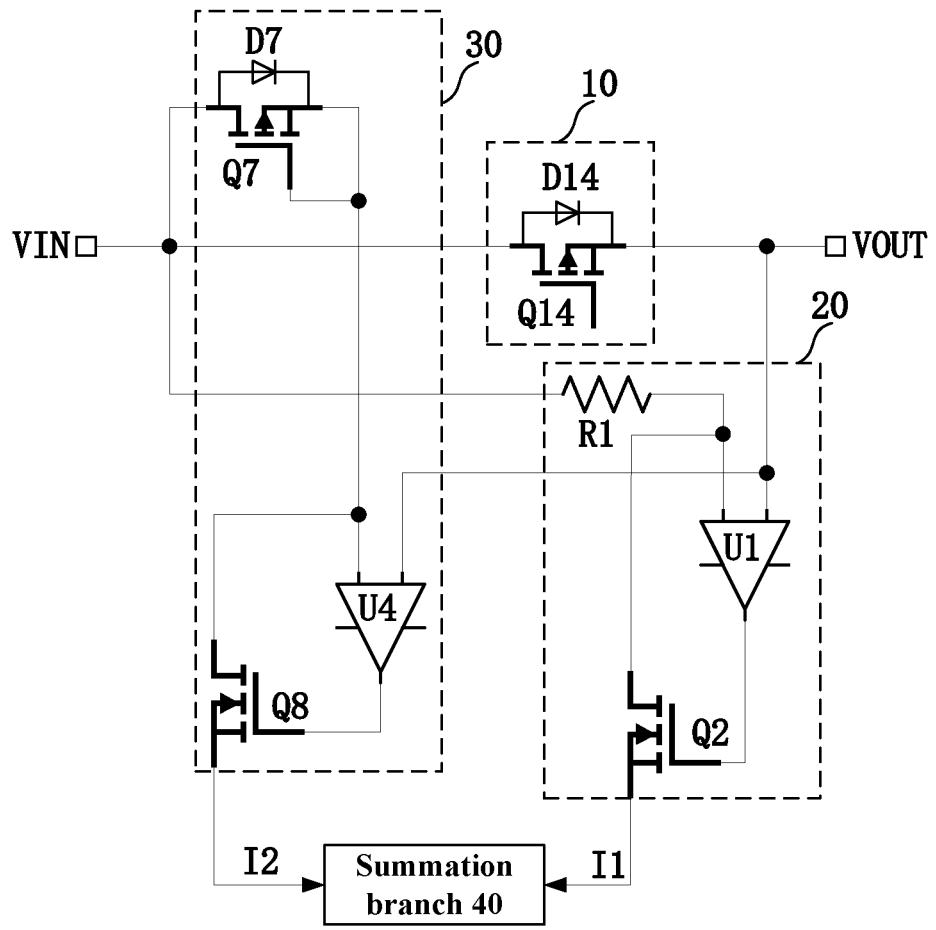
FIG. 3 illustrates a circuit diagram of the current detection circuit provided in one embodiment of the present application.

Please refer to FIG. 3, which exemplarily shows a circuit structure of the current detection circuit 100. In one embodiment, as shown in FIG. 3, the switch branch 10 comprises a fourteenth transistor Q14. The second terminal of the fourteenth transistor Q14 and the cathode of the body diode in the fourteenth transistor Q14 are both connected to the signal output terminal VOUT. The third terminal of the fourteenth transistor Q14 and the anode of the body diode in the fourteenth transistor Q14 are both connected to the signal input terminal VIN.

One function of the fourteenth transistor Q14 is to prevent a reverse flow of the current. When the fourteenth transistor Q14 is controlled to be turned off, the body diode of the fourteenth transistor Q14 can prevent the current from flowing back from the signal output terminal VOUT to the signal input terminal VIN. Another function of the fourteenth transistor Q14 is that when the fourteenth transistor Q14 is controlled to be conducting, the current flowing through the fourteenth transistor Q14 from the signal input terminal VIN to the signal output terminal VOUT (i.e., the switch branch current) can be detected by the current detection circuit 100.

The current flowing through the fourteenth transistor Q14 is divided into two parts. The first part of the current is the current flowing through the channel of the fourteenth transistor Q14. When the fourteenth transistor Q14 is conducting, the on-resistance of the fourteenth transistor Q14 can be equivalent to a resistor. As such, this channel current is linearly related to the first voltage difference. The second part of current is the current flowing through the body diode D14 of the fourteenth transistor Q14, and this current is exponentially related to the first voltage difference. When the first voltage difference is small, the second part of current flowing through the body diode D14 of the fourteenth transistor Q14 can be neglected. However, when the first voltage difference is large, continuing to neglect this second part of current will introduce significant errors in the current detection. The present invention aims to achieve higher current detection accuracy by separately detecting the first part of the current and the second part of the current through the construction of the first current detection branch and the second current detection branch.

In one embodiment, the first current detection branch 20 comprises a first resistor R1, a first amplifier U1, and a second transistor Q2. The first resistor R1 is connected to both the signal input terminal VIN and the first amplifier U1. Specifically, the second input terminal of the first amplifier U1 is connected to the signal output terminal VOUT. The output terminal of the first amplifier U1 is connected to the first terminal of the second transistor Q2. The second terminal of the second transistor Q2 is used to output the first detection current I1 to the summation branch 40. The first terminal of the first resistor R1 is connected to the first input terminal of the first amplifier U1 and the third terminal of the second transistor Q2. The second terminal of the first resistor R1 is also connected to the signal input terminal VIN.

The first resistor R1 is configured such that its resistance value is K times the equivalent resistance of the switch branch 10. The combination of the first amplifier U1 and the second transistor Q2 is configured to maintain the voltage at the common terminal of the first resistor R1 and the first amplifier U1 (i.e., the voltage at the first terminal of the first resistor R1) equal to the voltage at the signal output terminal VOUT, thereby causing the current flowing through the first resistor R1 to be the first detection current I1.

In one embodiment, the second current detection branch 30 comprises a seventh transistor Q7, a fourth amplifier U4, and an eighth transistor Q8. The seventh transistor Q7 is connected to the signal input terminal VIN, and the fourth amplifier U4 is connected to the seventh transistor Q7, the eighth transistor Q8 and the signal output terminal VOUT.

Specifically, the first terminal of the seventh transistor Q7 is connected to the second terminal of the seventh transistor Q7, the first input terminal of the fourth amplifier U4, and the third terminal of the eighth transistor Q8. The third terminal of the seventh transistor Q7 is connected to the signal input terminal VIN. The second input terminal of the fourth amplifier U4 is connected to the signal output terminal VOUT. The output terminal of the fourth amplifier U4 is connected to the first terminal of the eighth transistor Q8. The second terminal of the eighth transistor Q8 is used to output the second detection current I2 to the summation branch 40.

In the embodiment, the seventh transistor Q7 is configured such that the body diode D7 of the seventh transistor Q7 has the same structure as the body diode in the switch branch 10. The combination of the fourth amplifier U4 and the eighth transistor Q8 is configured to maintain the voltage at the common terminal of the fourth amplifier U4 and the seventh transistor Q7 equal to the voltage at the signal output terminal VOUT, thereby causing the current flowing through the body diode D7 of the seventh transistor Q7 to be the second detection current I2.

It should be noted that in the embodiments of this application, MOS transistors are used as examples. The gate of the MOS transistor corresponds to the first terminal of the transistor. The source corresponds to the second terminal, and the drain corresponds to the third terminal.

For example, as shown in FIG. 3, the second transistor Q2 is an NMOS transistor. The gate of the NMOS transistor corresponds to the first terminal of the second transistor Q2. The source corresponds to the second terminal, and the drain corresponds to the third terminal.

In addition, the transistors can be any controllable switches, such as insulated gate bipolar transistor (IGBT) devices, integrated gate-commutated thyristor (IGCT) devices, gate turn-off thyristor (GTO) devices, silicon-controlled rectifier (SCR) devices, junction field-effect transistor (JFET) devices, MOS-controlled thyristor (MCT) devices, etc.

The principle of the circuit structure shown in FIG. 3 is explained below. In practical applications, the signal input terminal VIN is usually connected to the input power supply, and the signal output terminal VOUT is usually connected to the load. Therefore, when the fourteenth transistor Q14 is conducting, the current flows from the signal input terminal VIN through the fourteenth transistor Q14 and enters the load through the signal output terminal VOUT. This current entering the load is referred to as the switch branch current.

In the related art, when detecting the current flowing into the load, usually only the current flowing through the channel of the fourteenth transistor Q14 is considered, while the current flowing through the body diode D14 of the fourteenth transistor Q14 is neglected. However, when the current flowing into the load is large, the voltage-drop across the channel resistance of the fourteenth transistor Q14 increases, resulting in an increased voltage across the body diode D14 and causing the body diode D14 to conduct more fully. As a result, the current flowing through the body diode D14 becomes significant, and neglecting this current will greatly reduce the detection accuracy.

In the embodiment of the present application, both the current flowing through the channel of the fourteenth transistor Q14 (which is related to the equivalent internal resistance of the fourteenth transistor Q14) and the current flowing through the body diode D14 of the fourteenth transistor Q14 are detected, thereby improving the detection accuracy. The specific detection process is as follows:

Regarding the current flowing through the channel of the fourteenth transistor Q14, which corresponds to the first part of the switch branch current, the following steps can be performed. Firstly, by utilizing the combination of the first amplifier U1 and the second transistor Q2, the "virtual short" characteristic between the two input terminals of the operational amplifier can be used to configure the voltage at the first terminal of the first resistor R1 to be equal to the voltage at the second terminal of the fourteenth transistor Q14. Secondly, the second terminal of the first resistor R1 and the third terminal of the fourteenth transistor Q14 are both connected to the signal input terminal VIN. Therefore, the voltage at the second terminal of the first resistor R1 is also equal to the voltage at the third terminal of the fourteenth transistor Q14. In summary, the voltage across the two terminals of the first resistor R1 is equal to the voltage between the second and third terminals of the fourteenth transistor Q14. At the same time, the resistance value of the first resistor R1 is K times the equivalent internal resistance of the fourteenth transistor Q14. Hence, the current flowing through the first resistor R1 corresponds to 1/K of the current flowing through the channel of the fourteenth transistor Q14. Due to the "virtual open" characteristic of the two input terminals of the operational amplifier, the current flowing through the first resistor R1 is equivalent to the current flowing through the second transistor Q2, which is the first detection current I1. The first detection current I1 represents the first part of the switch branch current as the first detection current I1 is 1/K of the first part of the switch branch current.

Regarding the current flowing through the body diode D14 of the fourteenth transistor Q14, which corresponds to the second part of the switch branch current, the following steps can be performed. Firstly, by short-circuiting the first terminal and the second terminal of the seventh transistor Q7, the seventh transistor Q7 operates in the off state. At this time, the current flows from the signal input terminal VIN through the body diode D7 of the seventh transistor Q7, the eighth transistor Q8, and enters the summing branch 40. Secondly, by utilizing the combination of the fourth amplifier U4 and the eighth transistor Q8, the "virtual short" characteristic between the two input terminals of the operational amplifier can be used to configure the voltage at the cathode of the body diode D7 of the seventh transistor Q7 to be equal to the voltage at the cathode of the body diode D14 of the fourteenth transistor Q14. Furthermore, the anode of the body diode D7 of the seventh transistor Q7 and the anode of the body diode D14 of the fourteenth transistor Q14 are both connected to the signal input terminal VIN. Hence, the voltage at the anode of the body diode D7 of the seventh transistor Q7 is also equal to the voltage at the anode of the body diode D14 of the fourteenth transistor Q14. In summary, the voltage across the two terminals of the body diode D7 of the seventh transistor Q7 is equal to the voltage across the two terminals of the body diode D14 of the fourteenth transistor Q14.

When the diode is forward-biased, the current can be expressed as:

$$I(D)=Is\times(e^{VD/Vt}-1)$$

In Equation above, Vt is the thermal voltage depending on temperature. Vt is approximately equal to 26 mV at room temperature, and Is is the reverse saturation current of the diode. It can be observed that the current flowing through the diode and the voltage difference VD across the diode terminals are exponentially related, meaning that the current flowing through the body diode D14 of the fourteenth transistor Q14 is exponentially related to the voltage difference between the signal input terminal VIN and the signal output terminal VOUT. Moreover, for diodes with the same structure, the reverse saturation current Is is proportional to the cross-sectional area of the diode.

Therefore, the body diode D7 of the seventh transistor Q7 and the body diode D14 of the fourteenth transistor Q14 can be configured as diodes with the same structure. As both the seventh transistor Q7 and the fourteenth transistor Q14 have transistor structures, with only a difference in size, the reverse saturation currents Is of the corresponding diodes are different. However, the currents flowing through the body diode D7 of the seventh transistor Q7 and the body diode D14 of the fourteenth transistor Q14 vary linearly with the voltage difference between their two terminals. Consequently, the current flowing through the body diode D7 of the seventh transistor Q7 can be configured as 1/K of the current flowing through the body diode D14 of the fourteenth transistor Q14. According to the "virtual open" characteristic of the operational amplifier input terminals, the current flowing through the body diode D7 of the seventh transistor Q7 is equivalent to the current flowing through the eighth transistor Q8, which is the second detection current I2. The second detection current I2 represents the second part of the switch branch current, as the second detection current I2 is 1/K of the second part of the switch branch current.

The sum of the first part of the switch branch current and the second part of the switch branch current is K times the sum of the first detection current I1 and the second detection current I2, which is the third detection current. The sum of the first part of the switch branch current and the second part of the switch branch current is also the total current flowing through the fourteenth transistor Q14 (corresponding to the current flowing through the switch branch in the above embodiments), which is the current flowing into the load. Therefore, the third detection current is equal to 1/K of the current flowing into the load. By obtaining the third detection current, the current flowing into the load can be determined with high accuracy.

Specifically, taking the implementation of the current detection circuit shown in FIG. 3 as an example, the seventh transistor Q7 and the fourteenth transistor Q14 are both PMOS transistors, while the second transistor Q2 and the eighth transistor Q8 are both NMOS transistors. Correspondingly, the first input terminals of the first amplifier U1 and the second amplifier U2 are configured as the in-phase input terminals of the respective amplifiers, and their second input terminals are configured as the inverted input terminals of the respective amplifiers.

It should be noted that the hardware structure of the current detection circuit 100 shown in FIG. 3 is only an example. The current detection circuit 100 can have more or fewer components than those shown in the figure. Two or more components may be combined. The components may have different component configurations. The various components shown in the figure can be implemented in a combination of hardware, software, or hardware and software, including one or more signal processing and/or dedicated integrated circuits.

Figure 4:
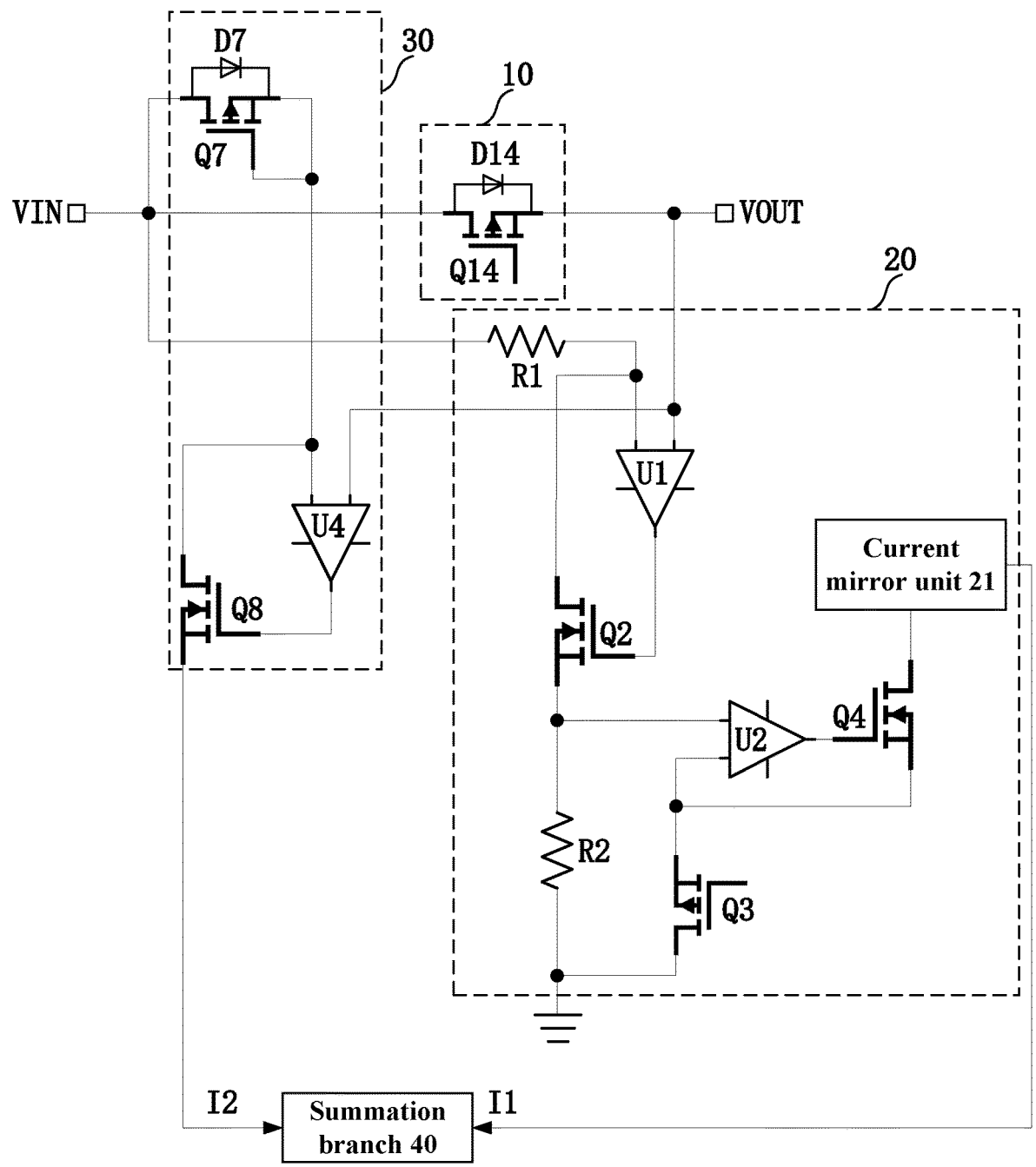
FIG. 4 illustrates a circuit diagram of the current detection circuit provided in a second embodiment of the present application.

For example, in one embodiment shown in FIG. 4, the first current detection branch 20 further comprises a second resistor R2, a third transistor Q3, a second amplifier U2, a fourth transistor Q4, and a current mirror unit 21 for temperature compensation.

The first terminal of the second resistor R2 is connected to the second terminal of the second transistor Q2 and the first input terminal of the second amplifier U2. The second input terminals of the second amplifier U2 are connected to the second terminal of the third transistor Q3 and the second terminal of the fourth transistor Q4. The output terminal of the second amplifier U2 is connected to the first terminal of the fourth transistor Q4. The second terminal of the second resistor R2 and the third terminal of the third transistor Q3 are both grounded. The third terminal of the fourth transistor Q4 is connected to the first terminal of the current mirror unit 21. The second terminal of the current mirror unit 21 is used to output the first detection current I1.

In this embodiment, the resistances of resistors and the on-resistances of the transistors usually have different temperature coefficients (i.e., the resistance of the first resistor R1 and the on-resistance of the fourteenth transistor Q14 usually have different temperature coefficients). Therefore, it is necessary to compensate for the temperature coefficient difference to more accurately control the current through the first resistor R1 as 1/K of the current flowing through the channel of the fourteenth transistor Q14. Specifically, the temperature coefficient difference between the resistance of the first resistor R1 and the on-resistance of the fourteenth transistor Q14 can be compensated by the second resistor R2, the third transistor Q3, the second amplifier U2, the fourth transistor Q4, and the current mirror unit 21. The second resistor R2 is of the same type as the first resistor R1, and the third transistor Q3 is of the same type as the fourteenth transistor Q14. Ideally, the voltage value of the reference remains constant regardless of temperature. The second amplifier U2 generates a current flowing through the third transistor Q3, which is mirrored by the current mirror unit 21 to produce the first detection current I1.

Specifically, the current IQ3 flowing through the third transistor Q3 and the fourth transistor Q14 can be expressed as:

$$IQ3 = IC14 \times (R2/R1) \times \left(\frac{RQ14}{RQ3}\right)$$

In Equation above, IC14 represents the current flowing through the channel of the fourteenth transistor, which is the first part of the switch branch current. R1 and R2 represent the resistance values of the first resistor R1 and the second resistor R2, respectively. RQ3 and RQ14 represent the on-resistance of the third transistor Q3 and the on-resistance of the fourteenth transistor Q14, respectively. From the equation, it can be seen that the relationship between IQ3 and the first part of the switch branch current is determined by the ratio of the resistance values of the first resistor R1 and the second resistor R2, and the ratio of the on-resistance of the third transistor Q3 and the on-resistance of the fourteenth transistor Q14. The relationship is not determined solely by the resistance values or on-resistance of any transistor or resistor. This configuration can effectively compensate for the influence of the temperature coefficient of the resistance and transistor on-resistance on the current ratio.

In some embodiments, the voltage difference between the first terminal and the second terminal of the third transistor Q3 needs to be kept the same as the voltage difference between the first terminal and the second terminal of the fourteenth transistor Q14 to maintain a stable ratio between the on-resistance of the third transistor Q3 and the on-resistance of the fourteenth transistor Q14. In practical applications, the voltage at the first terminal of the fourteenth transistor Q14 is the voltage between the first terminal and the second terminal of the fourteenth transistor Q14 plus the voltage at the signal output terminal VOUT. At this time, the voltage at the first terminal of the third transistor Q3 is the voltage at the first terminal of the fourteenth transistor Q14 minus the superimposed part (i.e., the voltage at the signal output terminal VOUT).

Understandably, the circuit structure shown in FIG. 4 aims to add a partial circuit for temperature compensation to eliminate errors that may arise from the temperature coefficient difference between the resistor and the on-resistance of the transistor. As for the part related to detecting the current flowing into the load, it is similar to the circuit structure shown in FIG. 3. Please refer to the detailed description of FIG. 3 for details, which will not be repeated herein.

Figure 5:
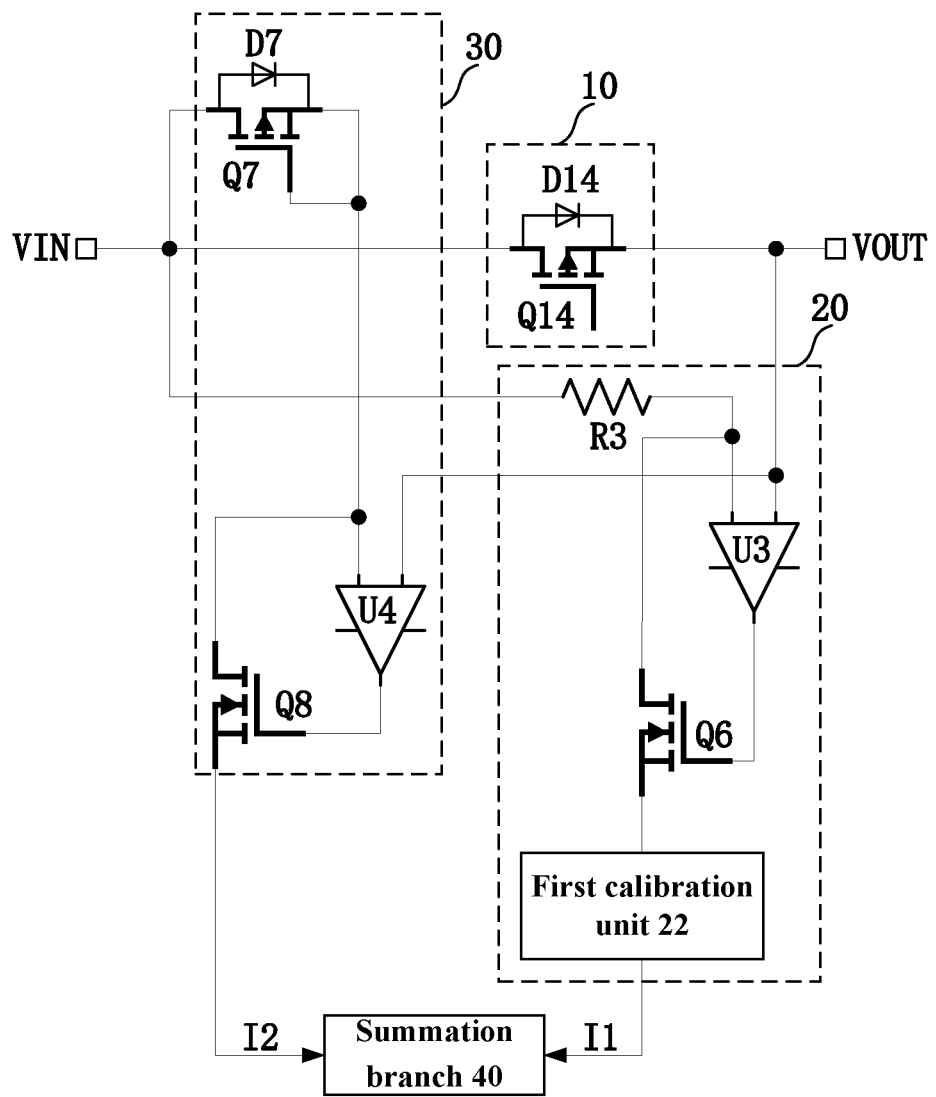
FIG. 5 illustrates a circuit diagram of the current detection circuit provided in a third embodiment of the present application.

Please refer to FIG. 5. FIG. 5 shows another structural example of the first current detection branch 20. As shown in FIG. 5, the first current detection branch 20 comprises a third resistor R3, a third amplifier U3, a sixth transistor Q6, and a first calibration unit 22. The third resistor R3 is connected to the signal input terminal VIN and the third amplifier U3. The first calibration unit 22 is connected to the sixth transistor Q6. Specifically, the second input terminal of the third amplifier U3 is connected to the signal output terminal VOUT. The output terminal of the third amplifier U3 is connected to the first terminal of the sixth transistor Q6. The second terminal of the sixth transistor Q6 is connected to the first terminal of the first calibration unit 22. The second terminal of the first calibration unit 22 is used to output the first detection current I1. The first terminal of the third resistor R3 is connected to the first input terminal of the third amplifier U3 and the third terminal of the sixth transistor Q6. The second terminal of the third resistor R3 is connected to the signal input terminal VIN.

In this embodiment, the combination of the third amplifier U3 and the sixth transistor Q6 is configured to maintain the voltage at the common terminal of the third resistor R3 and the third amplifier U3 equal to the voltage at the signal output terminal VOUT, so that the current flowing through the third resistor R3 is linearly related to the first part of the switch branch current. The first calibration unit 22 is configured to calibrate the current flowing through the sixth transistor Q6 in order to output the first detection current I1.

This embodiment differs from the circuit structure shown in FIG. 3. In particular, the first calibration unit 22 is added. As a result, it is not necessary to precisely achieve the resistance value of the first resistor R1 as K times the equivalent on-resistance of the fourteenth transistor Q14. Because the first calibration unit 22 can calibrate the gain and offset of the first current detection branch 20, which means the current entering the first calibration unit 22 does not have to be exactly 1/K of the current flowing through the channel of the fourteenth transistor Q14, the first calibration unit 22 adjusts it (i.e., the current entering the first calibration unit 22) to be 1/K of the current flowing through the channel of the fourteenth transistor Q14. In this embodiment, since it is not necessary to precisely achieve the resistance value of the first resistor R1 as K times the equivalent on-resistance of the fourteenth transistor Q14, it is easier to achieve in practical engineering and has higher practicality.

For example, the second resistor R2, the second amplifier U2, the third transistor Q3, the fourth transistor Q4, and the current mirror unit 21 in the temperature compensation unit shown in FIG. 4 can be considered as a specific implementation of the first calibration unit 22 shown in FIG. 5.

Figure 6:
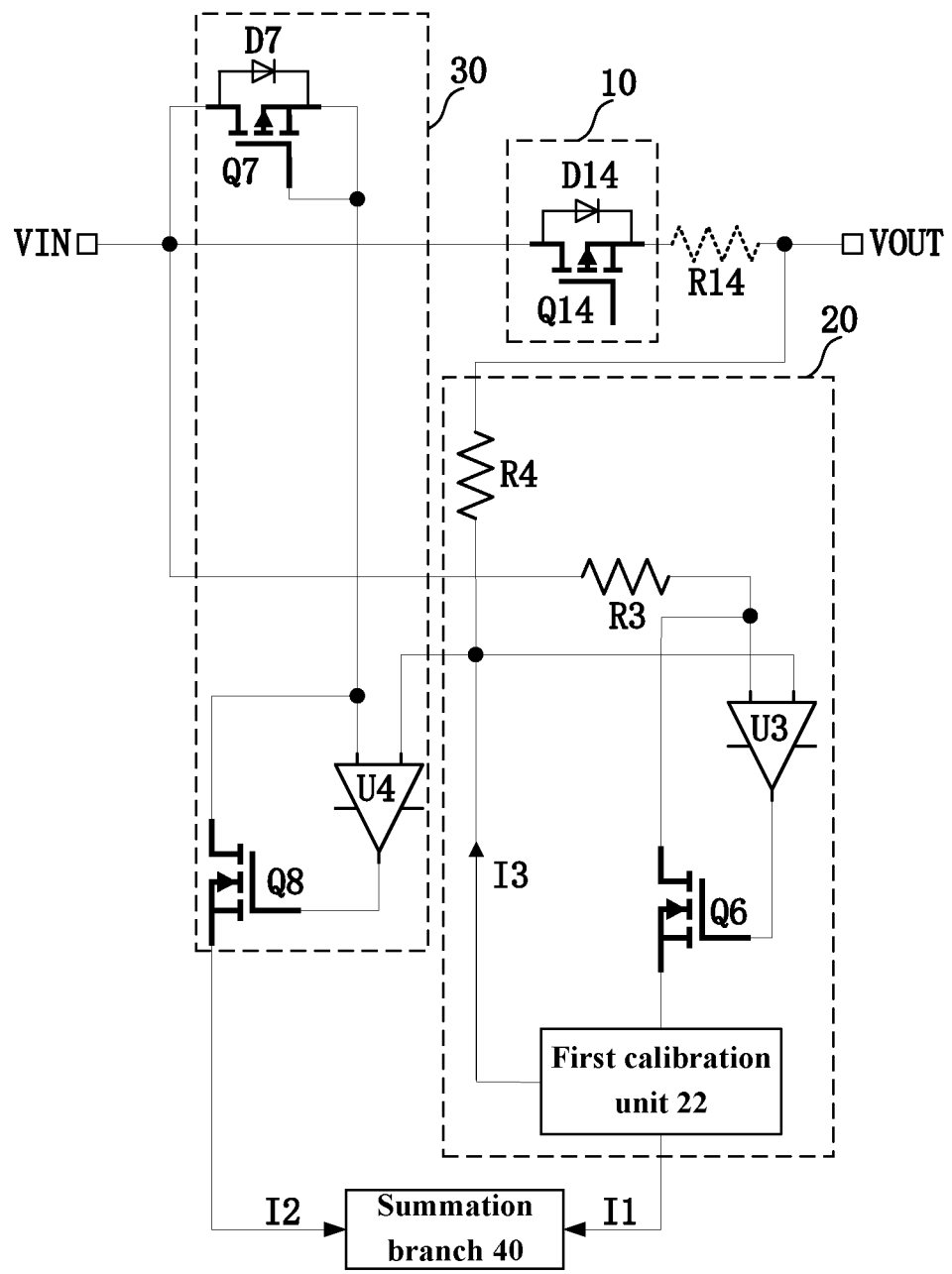
FIG. 6 illustrates a circuit diagram of the current detection circuit provided in a fourth embodiment of the present application.

In one embodiment, as shown in FIG. 6, the first current detection branch 20 further adds a compensating resistor R4 based on the structure in FIG. 5. The first terminal of the compensating resistor R4 is connected to the signal output terminal VOUT, and the second terminal of the compensating resistor R4 is connected to the second input terminal of the third amplifier U3 and the third terminal of the first calibration unit 22.

Specifically, the compensating resistor R4 is configured to have a voltage-drop formed by the current I3 output from the third terminal of the first calibration unit 22 equal to the voltage-drop across the first connecting line resistor. Here, the first connecting line refers to the connecting line between the switch branch 10 and the signal output terminal VOUT.

Figure 7:
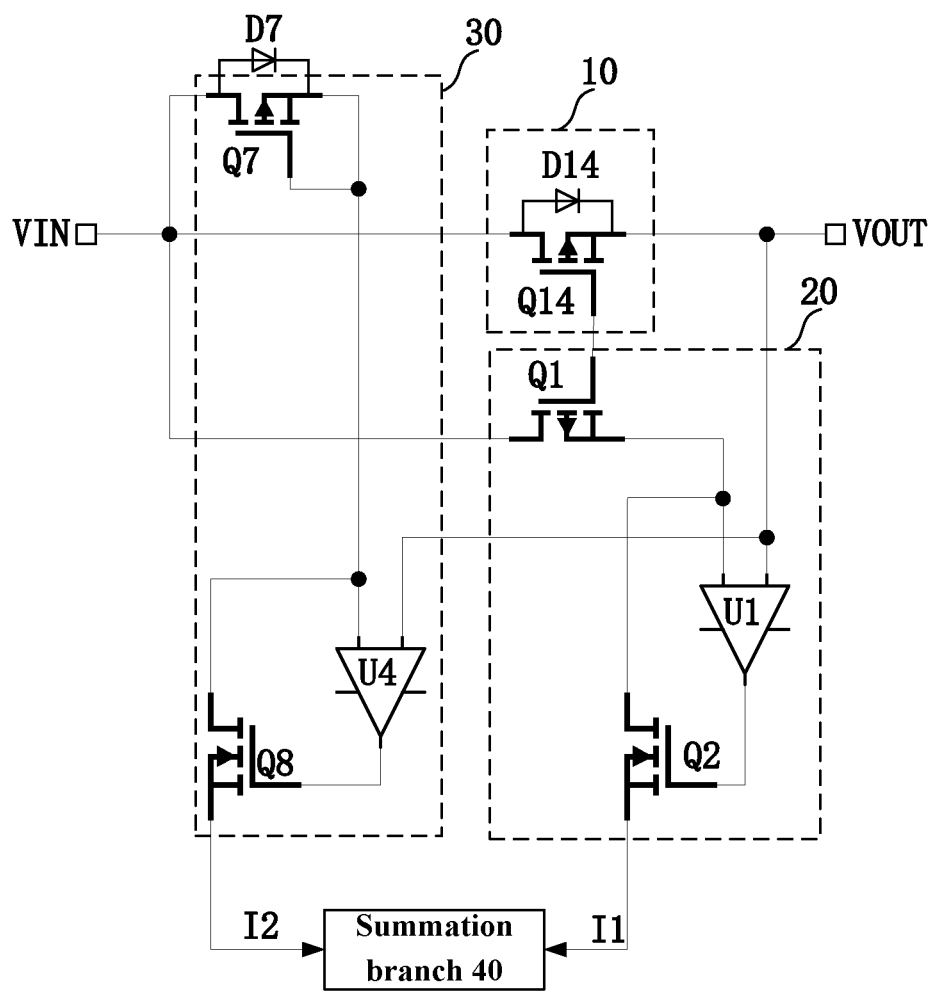
FIG. 7 illustrates a circuit diagram of the current detection circuit provided in a fifth embodiment of the present application.

In this embodiment, the resistor (represented as the fourteenth resistor R14 in FIG. 6) between the second terminal of the fourteenth transistor Q14 and the signal output terminal VOUT (i.e., the first connection line) affects the accuracy of current detection. Therefore, by setting a compensating resistor R4 and utilizing the current I3 output from the third terminal of the first calibration unit 22, a voltage-drop (referred to as the first voltage-drop V1) is generated across the compensating resistor R4. The voltage-drop across the two terminals of the fourteenth resistor R14 (i.e., the voltage-drop across the resistor on the first connection line, referred to as the second voltage-drop V2) is equal in magnitude to the first voltage-drop V1. The first voltage-drop V1 and the second voltage-drop V2 cancel each other out, thereby compensating for the voltage-drop across the resistor on the first connection line and improving the accuracy of current detection. Please refer to FIG. 7, which illustrates another structure of the first current detection branch 20. As shown in FIG. 7, the first current detection branch 20 comprises the first transistor Q1, the first amplifier U1, and the second transistor Q2.

The first transistor Q1 is connected to the signal input terminal VIN, the first amplifier U1, and the switch branch 10. The first amplifier U1 is also connected to the first transistor Q1, the second transistor Q2, and the signal output terminal VOUT.

Specifically, the second input terminal of the first amplifier U1 is connected to the signal output terminal VOUT. The output terminal of the first amplifier U1 is connected to the first terminal of the second transistor Q2. The second terminal of the second transistor Q2 is used to output the first detection current I1. The first terminal of the first transistor Q1 is connected to the first terminal of the fourteenth transistor Q14. The third terminal of the first transistor Q1 is connected to the signal input terminal VIN. The second terminal of the first transistor Q1 is connected to the first input terminal of the first amplifier U1 and the third terminal of the second transistor Q2.

In this embodiment, the first transistor Q1 is configured such that its equivalent on-resistance is K times the equivalent on-resistance of the switch branch 10. The combination of the first amplifier U1 and the second transistor Q2 is configured to maintain the voltage at the terminal of the first transistor Q1 connected to the first amplifier U1 equal to the voltage at the signal output terminal VOUT, so that the current flowing through the channel of the first transistor Q1 is the first detection current I1.

Specifically, the structure shown in FIG. 7 differs from the structure shown in FIG. 3 in that the first resistor R1 is replaced by the first transistor Q1, and the equivalent on-resistance of the first transistor Q1 serves the same purpose as the first resistor R1. Therefore, in this embodiment, the first transistor Q1 can be viewed as a resistor with a resistance value equal to the equivalent on-resistance of the first transistor Q1. Subsequently, the process of detecting the current flowing into the load is similar to the circuit structure shown in FIG. 3, within the understanding of those skilled in the art, and will not be further elaborated herein.

It is worth pointing out that, in most configurations, the first transistor Q1 in FIG. 7 also has a body diode. According to previous analysis, the body diode of the first transistor Q1 would have the same voltage across its two terminals as the body diode of the fourteenth transistor Q14. In this case, it may also carry current when the fourteens transistor Q14 is turned on. However, due to process and transistor layout limitations, it is very difficult to design a first transistor Q1 such that the ratio between the current flowing through its channel and the first portion of the switch branch current is the same as the ratio between the current flowing through its body diode and the second portion of the switch branch current. Such that a dedicated second current detection branch comprising diode connected seventh transistor Q7 is always required to achieve high accuracy current detection.

Additionally, in this embodiment, it is only necessary to configure the first transistor Q1 and the fourteenth transistor Q14 as the same type of transistors with similar temperature characteristics. Therefore, there is no need to set up additional circuitry for temperature compensation. Moreover, since the first transistor Q1 and the fourteenth transistor Q14 have similar structures, the specific ratio of their width-to-length ratios can be configured to achieve a specific ratio of equivalent on-resistances.

Figure 8:
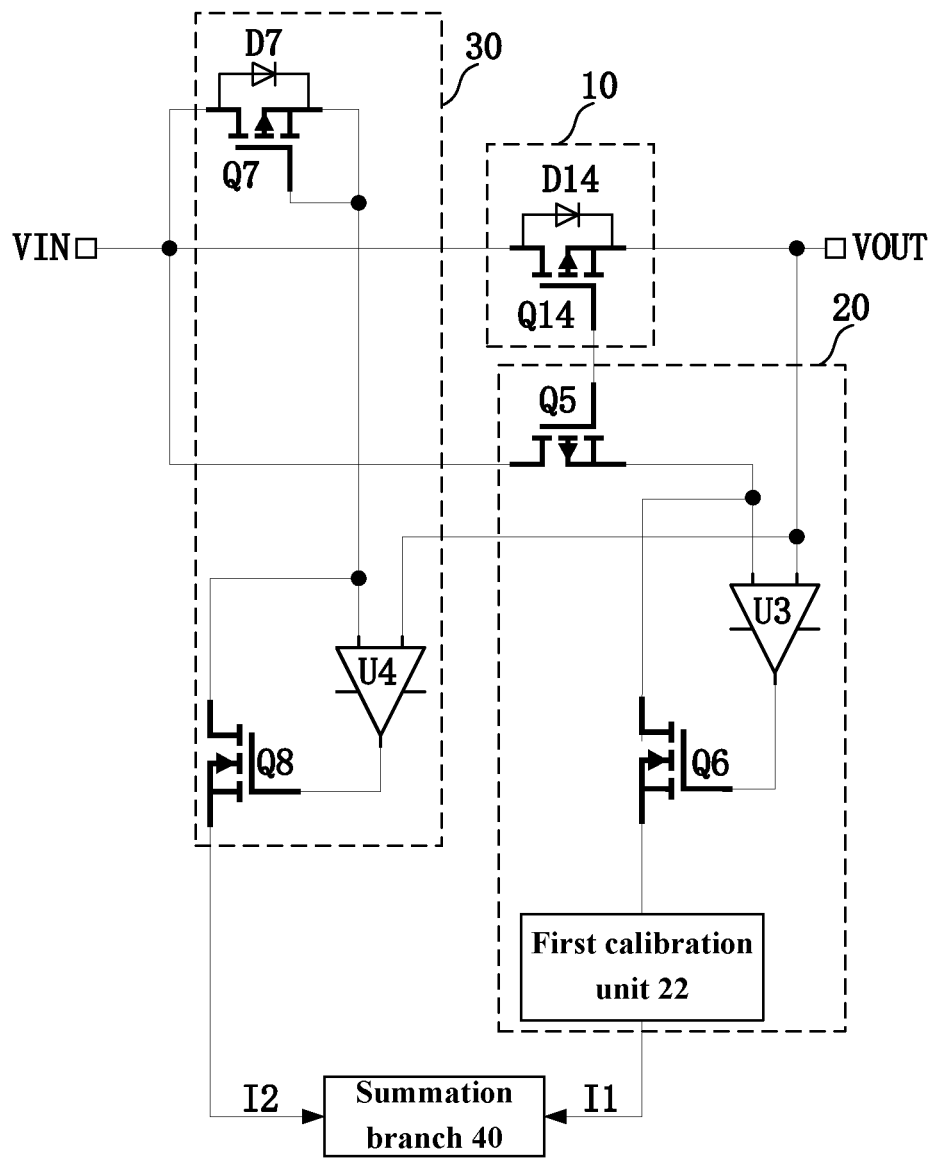
FIG. 8 illustrates a circuit diagram of the current detection circuit provided in a sixth embodiment of the present application.

It should be understood that similar technical features added in FIG. 5 or 6 are also applicable to the circuit structure shown in FIG. 7. For example, in one embodiment, as shown in FIG. 8, the first current detection branch 20 comprises the fifth transistor Q5, the third amplifier U3, the sixth transistor Q6, and the first calibration unit 22. The fifth transistor Q5 is connected to the signal input terminal VIN, the third amplifier U3, and the switch branch 10. The third amplifier U3 is also connected to the fifth transistor Q5, the sixth transistor Q6, and the signal output terminal VOUT.

Specifically, the second input terminal of the third amplifier U3 is connected to the signal output terminal VOUT. The output terminal of the third amplifier U3 is connected to the first terminal of the sixth transistor Q6. The second terminal of the sixth transistor Q6 is connected to the first terminal of the first calibration unit 22. The second terminal of the first calibration unit 22 is used to output the first detection current I1. The first terminal of the fifth transistor Q5 is connected to the first terminal of the fourteenth transistor Q14. The third terminal of the fifth transistor Q5 is connected to the signal input terminal VIN. The second terminal of the fifth transistor Q5 is connected to the first input terminal of the third amplifier U3 and the third terminal of the sixth transistor Q6.

In this embodiment, the combination of the third amplifier U3 and the sixth transistor Q6 is configured to maintain the voltage at the common terminal of the fifth transistor Q5 and the third amplifier U3 equal to the voltage at the signal output terminal VOUT, so that the current flowing through the channel of the fifth transistor Q5 is linearly related to the first current. The first calibration unit 22 is connected to the sixth transistor Q6, and it is configured to calibrate the current flowing through the sixth transistor Q6 in order to output the first detection current I1.

The difference between this embodiment and the circuit structure shown in FIG. 7 is the addition of the first calibration unit 22. Therefore, there is no need to accurately achieve the equivalent on-resistance of the fifth transistor Q5 to be K times the equivalent on-resistance of the fourteenth transistor Q14. The first calibration unit 22 can perform calibration of gain and offset, meaning that the current entering the first calibration unit 22 does not need to be precisely 1/K times the current flowing through the channel of the fourteenth transistor Q14. Instead, the first calibration unit 22 calibrates the current entering the first calibration unit 22 to be 1/K times the current flowing through the channel of the fourteenth transistor Q14. In this embodiment, since it is not necessary to accurately achieve the equivalent on-resistance of the fifth transistor Q5 to be K times the equivalent on-resistance of the fourteenth transistor Q14, it is easier to implement and more practical in actual engineering.

Figure 9:
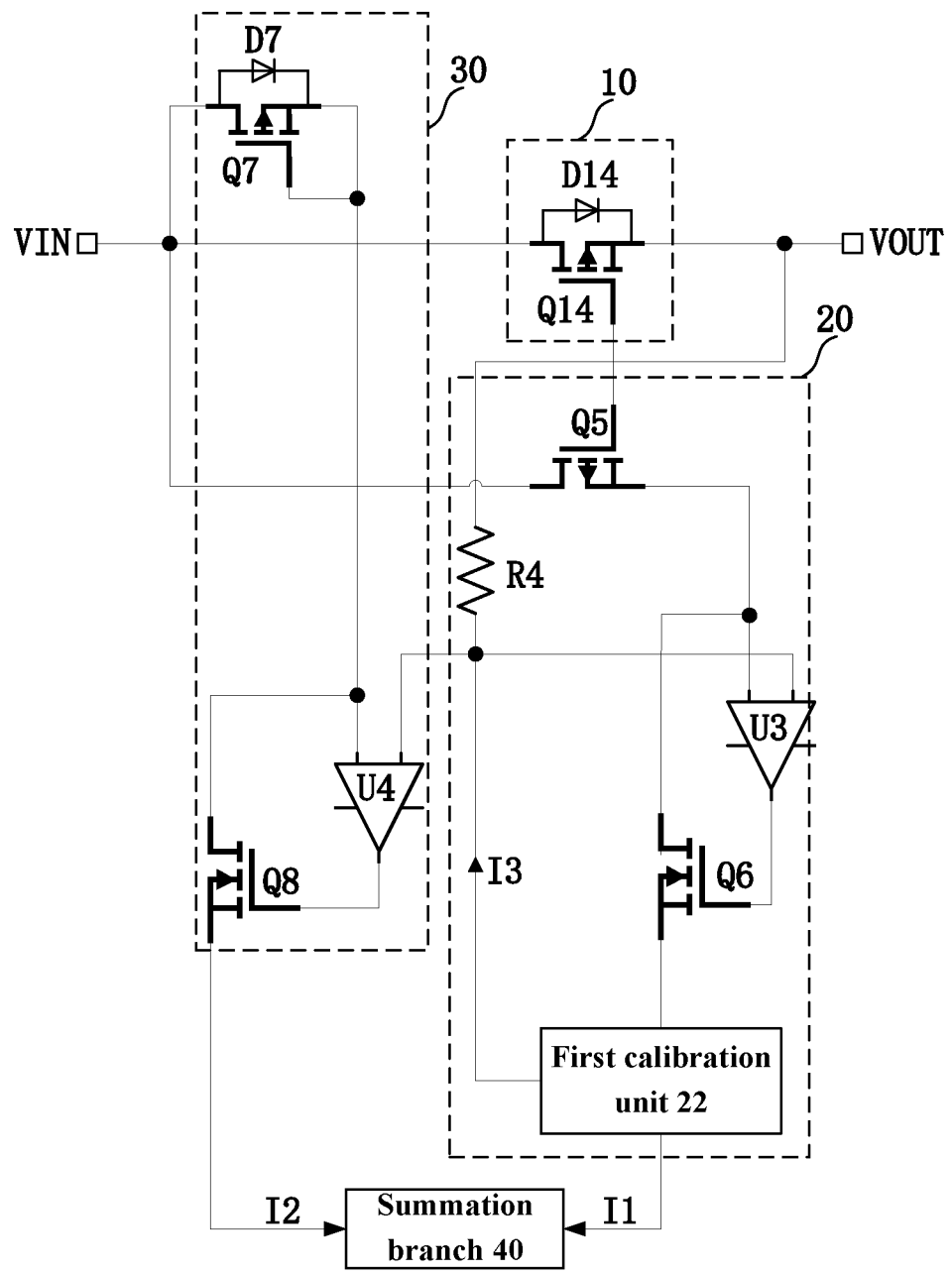
FIG. 9 illustrates a circuit diagram of the current detection circuit provided in a seventh embodiment of the present application.

Another example is shown in FIG. 9, where a compensating resistor R4 is added to the structure in FIG. 8. The specific implementation of the compensating resistor R4 can be referred to the description for FIG. 6 and will not be reiterated herein.

Figure 10:
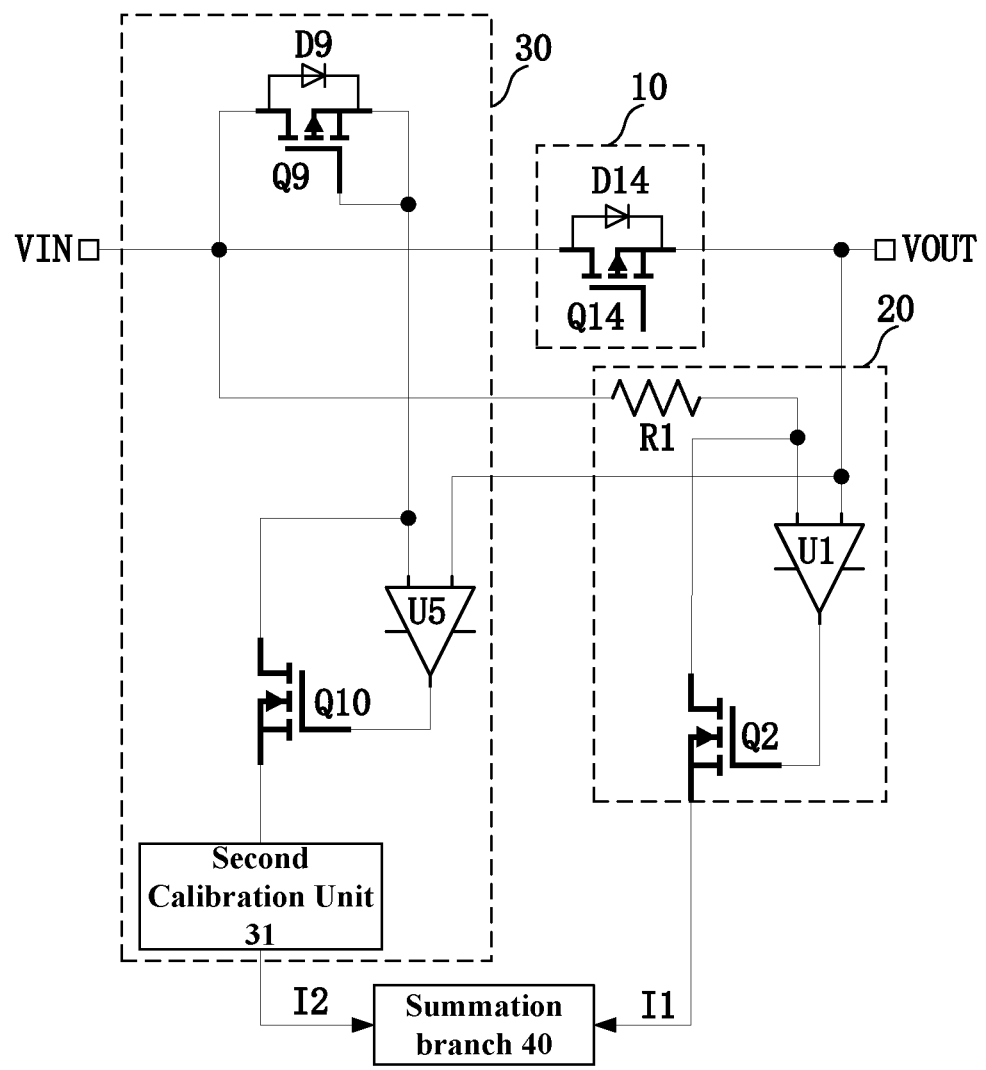
FIG. 10 illustrates a circuit diagram of the current detection circuit provided in an eighth embodiment of the present application.

Please refer to FIG. 10, which illustrates another structure of the second current detection branch 30. The circuit structure shown in FIG. 10 is obtained by modifying the structure of the second current detection branch 30 shown in FIG. 3. In FIG. 10, the second current detection branch 30 comprises the ninth transistor Q9, the fifth amplifier U5, the tenth transistor Q10, and the second calibration unit 31. The ninth transistor Q9 is connected to the signal input terminal VIN. The fifth amplifier U5 is connected to the ninth transistor Q9, the tenth transistor Q10, and the signal output terminal VOUT. The second calibration unit 31 is connected to the tenth transistor Q10.

Specifically, the first terminal of the ninth transistor Q9 is connected to the second terminal of the ninth transistor Q9. The second terminal of the ninth transistor Q9 is connected to the first input terminal of the fifth amplifier U5 and the third terminal of the tenth transistor Q10. The second input terminal of the fifth amplifier U5 is connected to the signal output terminal VOUT. The output terminal of the fifth amplifier U5 is connected to the first terminal of the tenth transistor Q10. The second terminal of the tenth transistor Q10 is connected to the first terminal of the second calibration unit 31. The second terminal of the second calibration unit 31 is used to output the second detection current I2.

In this embodiment, the ninth transistor Q9 is configured such that the body diode D9 of the ninth transistor Q9 has the same structure as the body diode in the switch branch 10. The combination of the fifth amplifier U5 and the tenth transistor Q10 is configured to maintain the voltage at the common terminal of the fifth amplifier U5 and the ninth transistor Q9 equal to the voltage at the signal output terminal VOUT, so that the current flowing through the body diode D9 of the ninth transistor Q9 is linearly related to the second partial current. The second calibration unit 31 is configured to calibrate the current flowing through the tenth transistor Q10 to output the second detection current I2.

The difference between this embodiment and the circuit structure shown in FIG. 3 is the addition of the second calibration unit 31. Therefore, the second calibration unit 31 can perform calibration of gain and offset, meaning that the current entering the second calibration unit 31 does not need to be precisely 1/K times the current flowing through the body diode D14 of the fourteenth transistor Q14. Instead, the second calibration unit 31 calibrates the current entering the second calibration unit 31 to be 1/K times the current flowing through the body diode D14 of the fourteenth transistor Q14.

It should be understood that the various technical features in different embodiments disclosed in this application can also be combined in other ways, which are easily understood by those skilled in the art and will not be reiterated herein.

Figure 11:
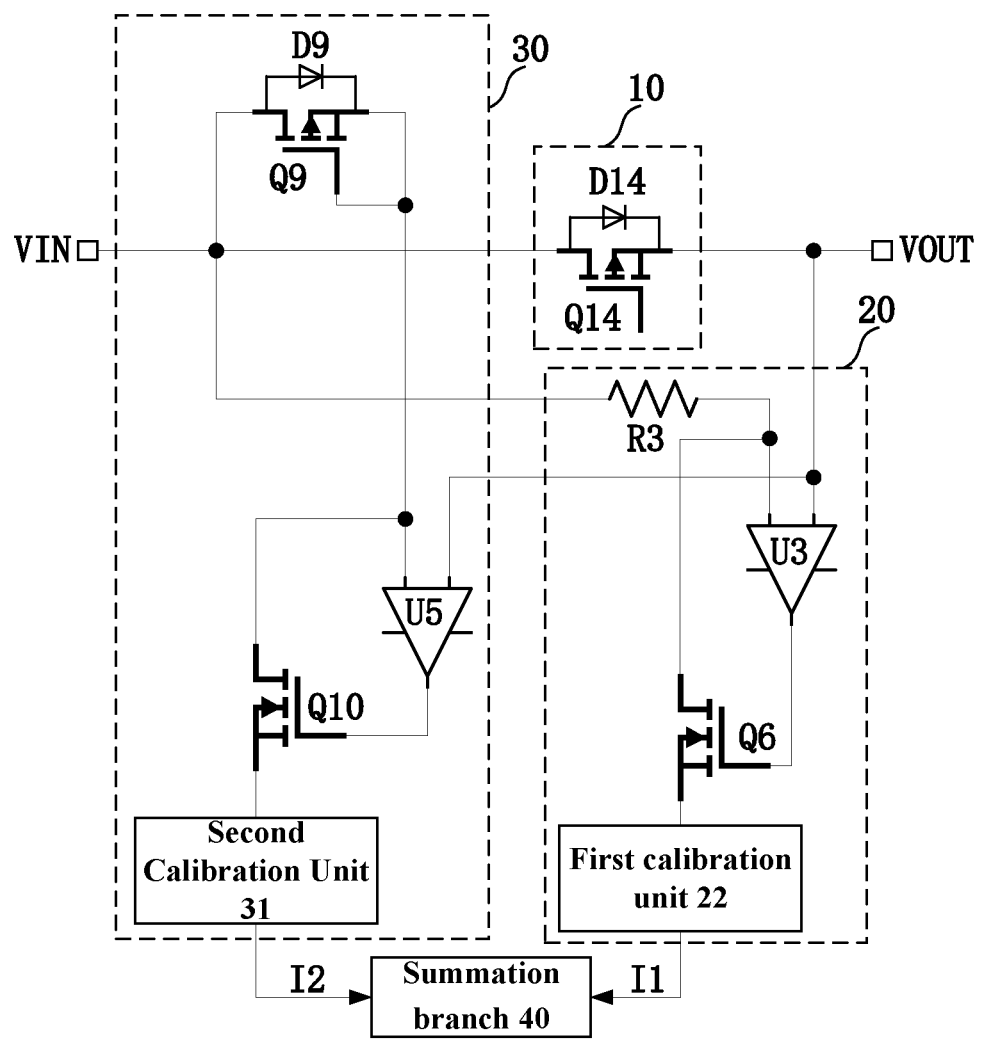
FIG. 11 illustrates a circuit diagram of the current detection circuit provided in a ninth embodiment of the present application.

For example, the specific structure of any one of the first current detection branches 20 shown in FIGS. 4-9 can be applied to the circuit structure shown in FIG. 10. For instance, the specific structure of the first current detection branch 20 shown in FIG. 5 can be applied to the circuit structure shown in FIG. 10, resulting in the structure shown in FIG. 11.

In some embodiments, for the current detection circuit 100 according to the present application, calibration can also be performed to reduce errors and improve the accuracy of current detection. The specific process may comprise the following aspects:

Firstly, calibrating the input offset voltage of each amplifier. There are many general calibration methods available in the relevant technology, which will not be reiterated herein.

Secondly, calibrating the current flowing into the first calibration unit 22 to achieve that when the switch branch current is small, the first detection current I1 is 1/K times the current flowing through the channel of the fourteenth transistor Q14. This calibration is performed when the switch branch current, (the voltage difference between the drain and source of the fourteenth transistor Q14) is small to ensure that the switch branch current is primarily composed of the current flowing through the channel of the fourteenth transistor Q14. Similarly, there are many general calibration methods available in the relevant technology, which will not be reiterated herein.

Thirdly, calibrating the total gain error ΔG. After the above calibration, the remaining errors comprise the gain error between the ratio of the current flowing through the body diode D7 of the seventh transistor Q7 and the current flowing through the body diode D14 of the fourteenth transistor Q14 and 1/K, and the gain errors of each amplifier. The gain error between the ratio of the current flowing through the body diode D7 of the seventh transistor Q7 and the current flowing through the body diode D14 of the fourteenth transistor Q14 can be combined with the gain errors of each amplifier to form the total gain error ΔG, which can be eliminated through calibration.

First, by detection, obtaining two sets of first detection current I1 and second detection current I2. Then, substituting these two sets of first detection current I1 and second detection current I2 into the following equation:

$$Isns = \frac{I(Mr\_ch)}{K} + I(Mr\_Db) \times e^{(Ids(Mr) \times Rd)/Vt/(K+\Delta G)} \quad (1)$$

In Equation (1), Isns is the third detection current. I(Mr_ch) is the first detection current I1. I(Mr_Db) is the second detection current I2. Ids(Mr) is the switch branch current. Rd is the resistor error, and ΔG is the gain error.

By substituting the two sets of first detection current I1 and second detection current I2 into Equation (1), the resistor error Rd and the gain error ΔG can be obtained. Then, the switch branch current Ids (Mr) can be determined based on the following equation:

$$Ids(Mr) = (K + \Delta G) \times Isns$$

Thus, the calibration of the total gain error is achieved.

Figure 12:
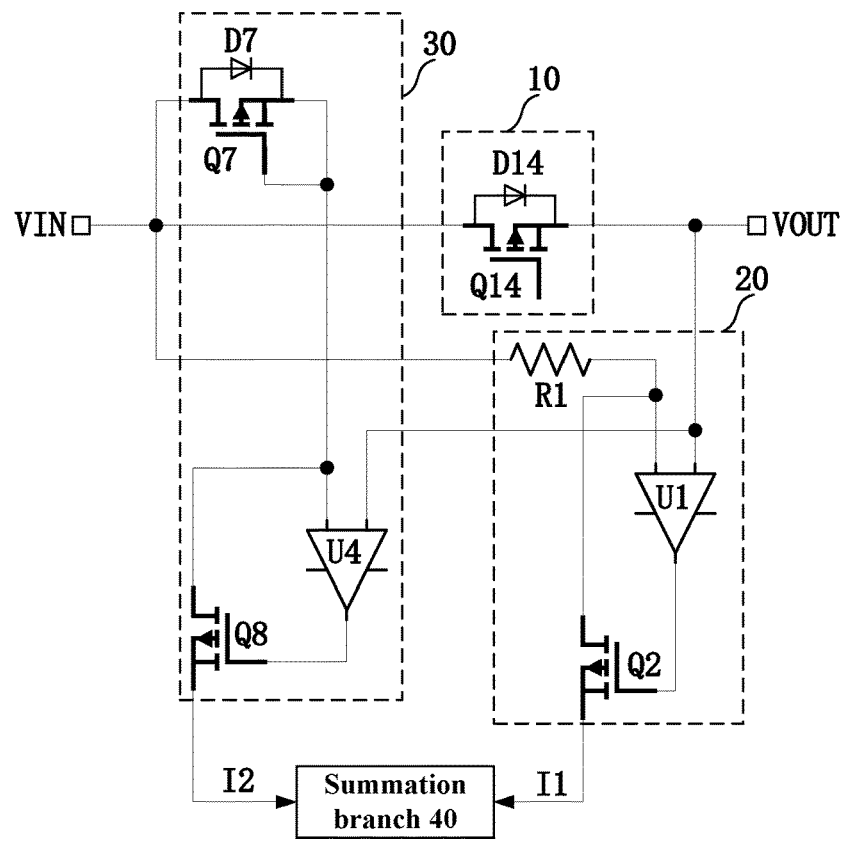
FIG. 12 illustrates a circuit diagram of the current detection circuit provided in a tenth embodiment of the present application.
Figure 12:
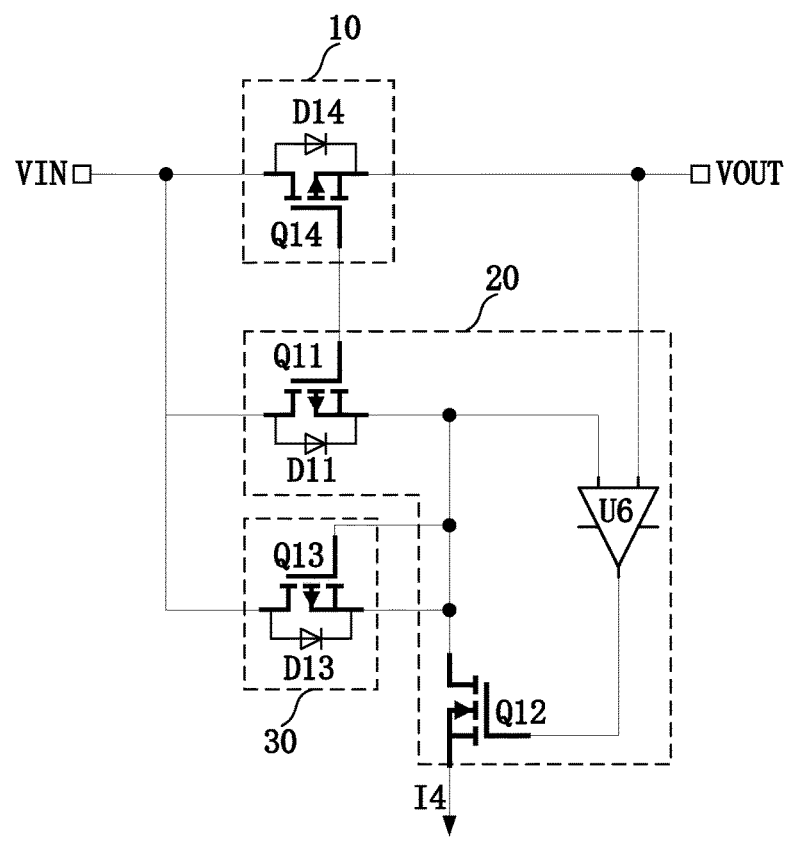

Please refer to FIG. 12. FIG. 12 illustrates another exemplary structure of the current detection circuit 100. As shown in FIG. 12, the first current detection branch 20 comprises the eleventh transistor Q11, the twelfth transistor Q12, and the sixth amplifier U6.

The eleventh transistor Q11 is connected to the signal input terminal VIN, the sixth amplifier U6, and the switch branch 10. The sixth amplifier U6 is also connected to the eleventh transistor Q11, the twelfth transistor Q12, and the signal output terminal VOUT.

Specifically, the first terminal of the eleventh transistor Q11 is connected to the switch branch 10. The second terminal of the eleventh transistor Q11 is connected to the first input terminal of the sixth amplifier U6 and the third terminal of the twelfth transistor Q12. The third terminal of the eleventh transistor Q11 is connected to the signal input terminal VIN.

In this embodiment, the eleventh transistor Q11 is configured with an equivalent internal resistance K time that of the equivalent resistance of the switch branch 10. The combination of the sixth amplifier U6 and the twelfth transistor Q12 is configured to maintain the voltage at the common terminal of the eleventh transistor Q11 and the sixth amplifier U6 equal to the voltage at the signal output terminal VOUT, resulting in the current flowing through the channel of the eleventh transistor Q11 representing the first portion of the switch branch current divided by K.

In another embodiment, the second current detection branch 30 comprises the thirteenth transistor Q13. The first terminal of the thirteenth transistor Q13 is connected to both the second terminal of the thirteenth transistor Q13 and the first current detection branch 20. The third terminal of the thirteenth transistor Q13 is connected to the signal input terminal VIN.

The current flowing through the body diode D13 of the thirteenth transistor Q13 represents the second detection current I2, and the sum of the second detection current I2 and the current flowing through the body diode D11 of the eleventh transistor Q11 is equal to the second portion of the switch branch current divided by K.

The principles of the circuit structure shown in FIG. 12 are explained as follows:

Regarding the current flowing through the channel of the fourteenth transistor Q14, which represents the first portion of the switch branch current, firstly, by using the combination of the sixth amplifier U6 and the twelfth transistor Q12, the voltage at the second terminal of the eleventh transistor Q11 can be configured to be equal to the voltage at the second terminal of the fourteenth transistor Q14. Secondly, since the third terminal of the eleventh transistor Q11 and the third terminal of the fourteenth transistor Q14 are both connected to the signal input terminal VIN, the voltage at the third terminal of the eleventh transistor Q11 is also equal to the voltage at the third terminal of the fourteenth transistor Q14. Therefore, the voltage between the second terminal and the third terminal of the eleventh transistor Q11 is equal to the voltage between the second terminal and the third terminal of the fourteenth transistor Q14. Additionally, the equivalent internal resistance of the eleventh transistor Q11 is K times that of the equivalent resistance of the fourteenth transistor Q14. Hence, the current flowing through the channel of the eleventh transistor Q11 corresponds to 1/K times the current flowing through the channel of the fourteenth transistor Q14. The current flowing through the channel of the eleventh transistor Q11 represents the first detection current I1. The first detection current I1 represents the first portion of the switch branch current divided by K.

Regarding the current flowing through the body diode D14 of the fourteenth transistor Q14, which represents the second portion of the switch branch current, the first terminal of the thirteenth transistor Q13 is short-circuited with the second terminal of the thirteenth transistor Q13 to operate the thirteenth transistor Q13 in a normally closed state. At this time, the current flows from the signal input terminal VIN through the body diode D13 of the thirteenth transistor Q13 and the twelfth transistor Q12. By using the combination of the sixth amplifier U6 and the twelfth transistor Q12, the cathode voltage of the body diode D13 of the thirteenth transistor Q13 is made equal to the cathode voltage of the body diode D14 of the fourteenth transistor Q14. Furthermore, since the anode of the body diode D13 of the thirteenth transistor Q13 and the anode of the body diode D14 of the fourteenth transistor Q14 are both connected to the signal input terminal VIN, the anode voltage of the body diode D13 of the thirteenth transistor Q13 is also equal to the anode voltage of the body diode D14 of the fourteenth transistor Q14. Therefore, the voltage across the two terminals of the body diode D13 of the thirteenth transistor Q13 is equal to the voltage across the two terminals of the body diode D14 of the fourteenth transistor Q14. Additionally, the body diode D13 of the thirteenth transistor Q13 and the body diode D14 of the fourteenth transistor Q14 are the same type of diode. As mentioned earlier, when the body diode D13 of the thirteenth transistor Q13 and the body diode D14 of the fourteenth transistor Q14 are the same type of diode, the current flowing through the body diode D13 of the thirteenth transistor Q13 and the current flowing through the body diode D14 of the fourteenth transistor Q14 exhibit a linear relationship. Based on the same reasoning, it can be concluded that the current flowing through the body diode D11 of the eleventh transistor Q11 and the current flowing through the body diode D14 of the fourteenth transistor Q14 also exhibit a linear relationship.

Furthermore, the current flowing through the body diode D11 of the eleventh transistor Q11 and the current flowing through the body diode D13 of the thirteenth transistor Q13 can be combined to represent the current flowing through the body diode D14 of the fourteenth transistor Q14 divided by K.

In this case, the sum of the current flowing through the body diode D11 of the eleventh transistor Q11 and the current flowing through the body diode D13 of the thirteenth transistor Q13 represents the second detection current I2. The second detection current I2 represents the second portion of the switch branch current divided by K.

In this embodiment, the first portion of the switch branch current and the second portion of the switch branch current sum up to the current divided by K, which is equal to the third detection current (in this embodiment, the current flowing through the twelfth transistor Q12). The sum of the first portion of the switch branch current and the second portion of the switch branch current also represents the total current flowing through the fourteenth transistor Q14 (corresponding to the switch branch current in the above embodiment), which is the current flowing into the load. Therefore, the third detection current represents the current flowing into the load divided by K. By obtaining the third detection current, the current flowing into the load can be determined with higher accuracy.

In the circuit provided in this embodiment of the application, the second transistor Q2, sixth transistor Q6, eighth transistor Q8, tenth transistor Q10, and twelfth transistor Q12 can all be PMOS transistors. Similarly, the first transistor Q1, fifth transistor Q5, eleventh transistor Q11, seventh transistor Q7, ninth transistor Q9, thirteenth transistor Q13, fourteenth transistor Q14, and third transistor Q3 can all be NMOS transistors. In particular, when the seventh transistor Q7, ninth transistor Q9, and thirteenth transistor Q13 are implemented as NMOS transistors in different embodiments and are configured in the second current detection branch 30, their first terminals and second terminals are connected to the signal input terminal VIN, and their third terminals are connected to the first input terminal of the amplifier in their respective second current detection branch 30.

Figure 13:
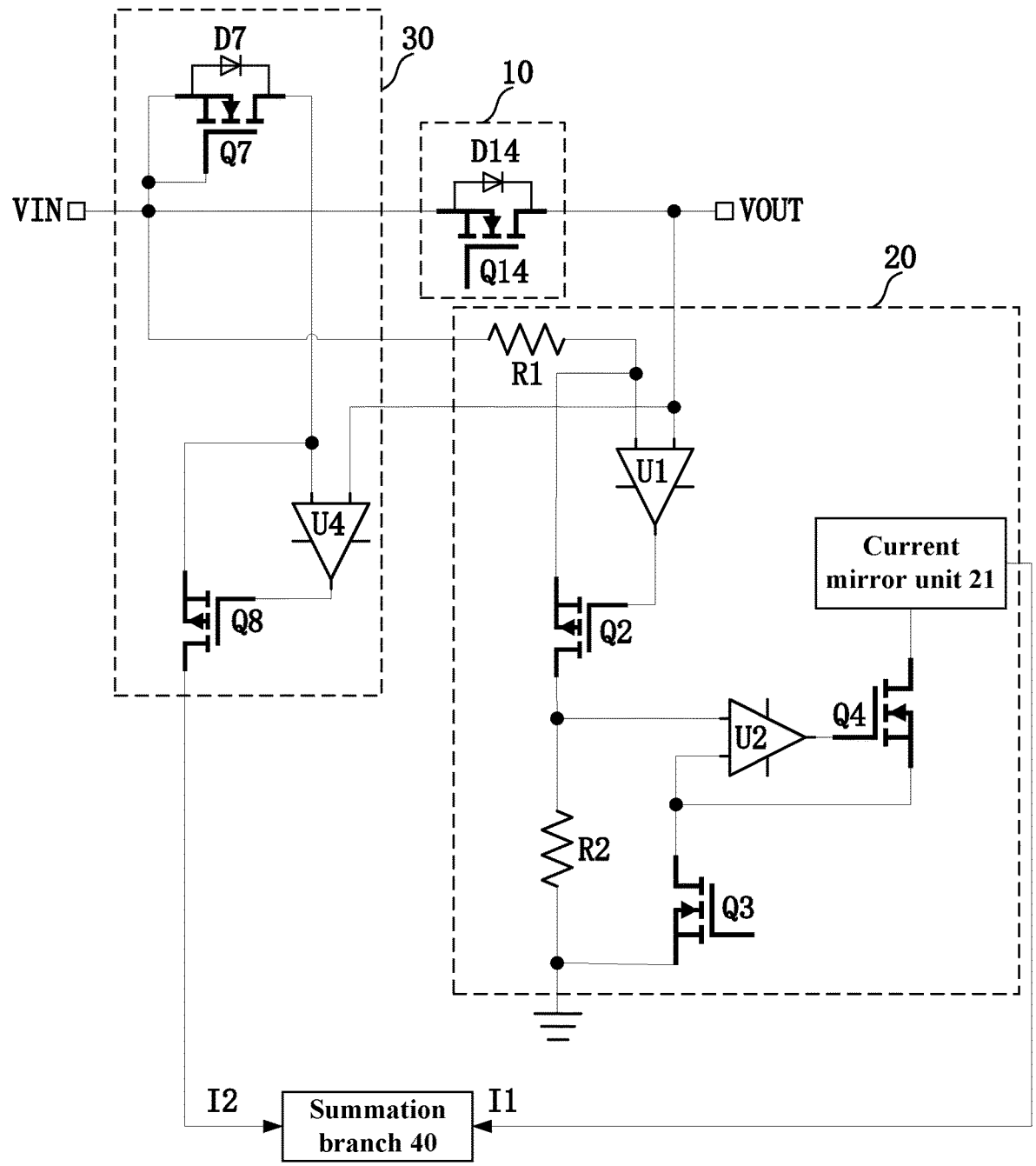
FIG. 13 illustrates a circuit diagram of the current detection circuit provided in an eleventh embodiment of the present application.

For example, FIG. 13 illustrates another implementation of the temperature-compensated current detection circuit shown in FIG. 4. In this case, the seventh transistor Q7, fourth transistor Q4, fourteenth transistor Q14, and third transistor Q3 are NMOS transistors, while the second transistor Q2 and eighth transistor Q8 are PMOS transistors. Specifically, the second terminal of the fourteenth transistor Q14 is connected to the second terminal of the first resistor R1 and the signal input terminal VIN. The third terminal of the fourteenth transistor Q14 is connected to the second input terminal of the first amplifier U1 and the signal output terminal VOUT. The first terminal of the first resistor R1 is connected to the first input terminal of the first amplifier U1 and the second terminal of the second transistor Q2. The third terminal of the second transistor Q2 is connected to the output terminal of the first amplifier U1. The first terminal of the second resistor R2 is connected to the third terminal of the second transistor Q2 and the first input terminal of the second amplifier U2. The second input terminal of the second amplifier U2 is connected to the third terminal of the third transistor Q3 and the second terminal of the fourth transistor Q4. The output terminal of the second amplifier U2 is connected to the first terminal of the fourth transistor Q4. The second terminal of the second resistor R2 and the second terminal of the third transistor Q3 are both grounded. The third terminal of the fourth transistor Q4 is connected to the first terminal of the current mirror unit 21. The second terminal of the current mirror unit 21 is used to output the first detection current I1. The first terminal of the seventh transistor Q7 is connected to the second terminal of the seventh transistor and the signal input terminal VIN. The third terminal of the seventh transistor Q7 is connected to the first input terminal of the fourth amplifier U4 and the second terminal of the eighth transistor Q8. The second input terminal of the fourth amplifier U4 is connected to the signal output terminal VOUT. The output terminal of the fourth amplifier U4 is connected to the first terminal of the eighth transistor Q8. The third terminal of the eighth transistor Q8 is used to output the second detection current I2.

In practical applications, the circuit structure shown in FIG. 13 is more easily implemented for temperature compensation. Specifically, the voltage at the first terminal of the third transistor Q3 needs to be maintained the same as the voltage difference between the first terminal of the fourteenth transistor Q14 and the signal input terminal VIN to keep the ratio between the on-resistances of the third transistor Q3 and the fourteenth transistor Q14 stable. In practical applications, the voltage at the first terminal of the fourteenth transistor Q14 is the sum of the voltage at the first terminal of the third transistor Q3 and the voltage at the signal input terminal VIN. In this case, the voltage at the first terminal of the third transistor Q3 is equal to the voltage at the first terminal of the fourteenth transistor Q14 minus the superimposed part (i.e., the voltage at the signal input terminal VIN).

This application also provides an electronic device that comprises the current detection circuit 100 as disclosed in any of the embodiments described above.

Finally, it should be noted that the above embodiments are provided for illustrating the technical solution of this application and should not be considered as limitations thereof. Under the concept of this application, the technical features of the above embodiments or different embodiments can also be combined, the steps can be implemented in any order, and there are many other changes as described above in various aspects of the application. For the sake of brevity, they are not provided in detail. Although detailed explanations have been given for the above embodiments with reference to the prior embodiments, those skilled in the art should understand that modifications can still be made to the technical solutions described in the aforementioned embodiments or that some technical features can be equivalently replaced. Such modifications or replacements do not depart from the essence of the technical solutions of the embodiments described in this application.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A current detection circuit comprising:
a signal input terminal, a signal output terminal, a switch branch, a first current detection branch, and a second current detection branch, wherein:
the switch branch and the first current detection branch are connected between the signal input terminal and the signal output terminal;
the second current detection branch is connected to the signal input terminal and the first current detection branch; and
the switch branch is configured to block the current flowing from the signal output terminal to the signal input terminal when the switch branch is turned off, and wherein:
when the switch branch is conducting, the current flowing from the signal input terminal through the switch branch to the signal output terminal is a switch branch current comprising a first current linearly related to a first voltage difference and a second current exponentially related to the first voltage difference, and wherein:
the first voltage difference is a voltage difference across the signal input terminal and the signal output terminal;
the first current detection branch is configured to output a first detection current representing the first current; and
the second current detection branch is configured to output a second detection current representing the second current.

2. The current detection circuit according to claim 1, wherein:
the current detection circuit further comprises a summation branch, and wherein the summation branch is connected to the first current detection branch and the second current detection branch and is configured to output a third detection current based on the first detection current and the second detection current, and wherein the third detection current is 1/K times the switch branch current, and K>1, and wherein K is a predetermined parameter derived from transistor sizes and resistance values.

3. The current detection circuit according to claim 2, wherein:
the first detection current is equal to 1/K of the first current.

4. The current detection circuit according to claim 3, wherein:
the first current detection branch comprises a first transistor, a first amplifier, and a second transistor, and wherein:
the first transistor is connected to the signal input terminal, the first amplifier, and the switch branch, and is configured with an equivalent resistance K times an equivalent resistance of the switch branch;
the first amplifier is connected to the first transistor, the second transistor, and the signal output terminal; and
a combination of the first amplifier and the second transistor is configured to maintain a voltage at a common terminal of the first transistor and the first amplifier equal to a voltage at the signal output terminal, so that the current flowing through the channel of the first transistor is the first detection current; or
the first current detection branch comprises a first resistor, the first amplifier, and the second transistor, and wherein:
the first resistor is connected to the signal input terminal and the first amplifier and is configured with a resistance value K times the equivalent resistance of the switch branch;
the first amplifier is connected to the second transistor and the first resistor; and
the combination of the first amplifier and the second transistor is configured to maintain the voltage at the common terminal of the first resistor and the first amplifier equal to the voltage at the signal output terminal, so that the current flowing through the first resistor is the first detection current.

5. The current detection circuit according to claim 4, wherein:

a second input terminal of the first amplifier is connected to the signal output terminal;
an output terminal of the first amplifier is connected to the first terminal of the second transistor; and
the second terminal of the second transistor is used to output the first detection current, and wherein:
when the first current detection branch comprises the first transistor, the first terminal of the first transistor is connected to the switch branch, the third terminal of the first transistor is connected to the signal input terminal, and the second terminal of the first transistor is connected to a first input terminal of the first amplifier and the third terminal of the second transistor; and
when the first current detection branch comprises the first resistor, the first terminal of the first resistor is connected to the first input terminal of the first amplifier and the third terminal of the second transistor, and the second terminal of the first resistor is connected to the signal input terminal.

6. The current detection circuit according to claim 5, wherein:
when the first current detection branch comprises the first resistor, the first current detection branch further comprises a second resistor for temperature compensation, a third transistor, a second amplifier, a fourth transistor, and a current mirror unit, and wherein:
a first terminal of the second resistor is connected to the second terminal of the second transistor and a first input terminal of the second amplifier;
a second input terminal of the second amplifier is connected to a second terminal of the third transistor and a second terminal of the fourth transistor;
the output terminal of the first amplifier is connected to a first terminal of the fourth transistor;
a second terminal of the second resistor and a third terminal of the third transistor are both grounded;
a third terminal of the fourth transistor is connected to a first terminal of the current mirror unit; and
a second terminal of the current mirror unit is used to output the first detection current.

7. The current detection circuit according to claim 1, wherein:
the current detection circuit further comprises a summation branch, and wherein the summation branch is connected to the first current detection branch and the second current detection branch and is configured to output a third detection current based on the first detection current and the second detection current, and wherein the third detection current is 1/K times the switch branch current, and K>1, and wherein K is a predetermined parameter derived from transistor sizes and resistance values, and wherein the first detection current is equal to 1/K of the first current, and wherein:
the first current detection branch comprises a fifth transistor, a third amplifier, a sixth transistor, and a first calibration unit, and wherein:
the fifth transistor is connected to the signal input terminal, the third amplifier, and the switch branch;
the third amplifier is also connected to the fifth transistor, the sixth transistor, and the signal output terminal, and a combination of the third amplifier and the sixth transistor is configured to maintain a voltage at a common terminal of the fifth transistor and the third amplifier equal to a voltage at the signal output terminal, so that a current flowing through a channel of the fifth transistor is linearly related to the first current; and
the first calibration unit is connected to the sixth transistor and is configured to calibrate a current flowing through the sixth transistor to output the first detection current; or
the first current detection branch comprises a third resistor, the third amplifier, the sixth transistor, and the first calibration unit, and wherein:
the third resistor is connected to the signal input terminal and the third amplifier;
a combination of the third amplifier and the sixth transistor is configured to maintain a voltage at a common terminal of the third resistor and the third amplifier equal to the voltage at the signal output terminal, so that the current flowing through the third resistor is linearly related to the first current;
the first calibration unit is connected to the sixth transistor and is configured to calibrate the current flowing through the sixth transistor to output the first detection current.

8. The current detection circuit according to claim 7, wherein:
a second input terminal of the third amplifier is connected to the signal output terminal;
an output terminal of the third amplifier is connected to a first terminal of the sixth transistor;
a second terminal of the sixth transistor is connected to a first terminal of the first calibration unit; and
a second terminal of the first calibration unit is used to output the first detection current, and wherein:
when the first current detection branch comprises the fifth transistor, a first terminal of the fifth transistor is connected to the switch branch, a third terminal of the fifth transistor is connected to the signal input terminal, and a second terminal of the fifth transistor is connected to a first input terminal of the third amplifier and a third terminal of the sixth transistor; and
when the first current detection branch comprises the third resistor, a first terminal of the third resistor is connected to the first input terminal of the third amplifier and the third terminal of the sixth transistor, and a second terminal of the third resistor is connected to the signal input terminal.

9. The current detection circuit according to claim 8, wherein the first current detection branch further comprises a compensating resistor, and wherein:
a first terminal of the compensating resistor is connected to the signal output terminal;
a second terminal of the compensating resistor is connected to the second input terminal of the third amplifier and the third terminal of the first calibration unit; and
the compensating resistor is configured such that a voltage-drop on the compensating resistor by a current output from the third terminal of the first calibration unit is equal to a voltage-drop on a connecting line, and wherein the connecting line is a connection between the switch branch and the signal output terminal.

10. The current detection circuit according to claim 1, wherein:
the second detection current is equal to 1/K of the second current, and wherein K is a predetermined parameter derived from transistor sizes and resistance values.

11. The current detection circuit according to claim 10, wherein the second current detection branch comprises a seventh transistor, a fourth amplifier and an eighth transistor, and wherein:
   the seventh transistor is connected to the signal input terminal, and the seventh transistor is configured such that a body diode of the seventh transistor and a body diode in the switch branch have the same diode structure;
   the fourth amplifier is connected to the seventh transistor, the eighth transistor, and the signal output terminal; and
   a combination of the fourth amplifier and the eighth transistor is configured to maintain a voltage at a common terminal of the fourth amplifier and the seventh transistor equal to a voltage at the signal output terminal, so that a current flowing through the body diode of the seventh transistor is the second detection current.

12. The current detection circuit according to claim 11, wherein:
   a first terminal of the seventh transistor is connected to a second terminal of the seventh transistor, a first input terminal of the fourth amplifier, and a third terminal of the eighth transistor;
   a third terminal of the seventh transistor is connected to the signal input terminal;
   a second input terminal of the fourth amplifier is connected to the signal output terminal;
   an output terminal of the fourth amplifier is connected to a first terminal of the eighth transistor; and
   a second terminal of the eighth transistor is used to output the second detection current.

13. The current detection circuit according to claim 1, wherein the second detection current is equal to 1/K of the second current, and wherein K is a predetermined parameter derived from transistor sizes and resistance values, and wherein the second current detection branch comprises a ninth transistor, a fifth amplifier, a tenth transistor and a second calibration unit, and wherein:
   the ninth transistor is connected to the signal input terminal, and the ninth transistor is configured such that a body diode of the ninth transistor and a body diode in the switch branch have the same diode structure;
   the fifth amplifier is connected to the ninth transistor, the tenth transistor, and the signal output terminal;
   a combination of the fifth amplifier and the tenth transistor is configured to maintain a voltage at a common terminal of the fifth amplifier and the ninth transistor equal to a voltage at the signal output terminal, so that a current flowing through the body diode of the ninth transistor is linearly related to the second current; and
   the second calibration unit is connected to the tenth transistor, and the second calibration unit is configured to calibrate a current flowing through the tenth transistor to output the second detection current.

14. The current detection circuit according to claim 13, wherein:
   a first terminal of the ninth transistor is connected to a second terminal of the ninth transistor;
   the second terminal of the ninth transistor is connected to a first input terminal of the fifth amplifier and a third terminal of the tenth transistor;
   a second input terminal of the fifth amplifier is connected to the signal output terminal;
   an output terminal of the fifth amplifier is connected to a first terminal of the tenth transistor;
   a second terminal of the tenth transistor is connected to a first terminal of the second calibration unit; and
   a second terminal of the second calibration unit is used to output the second detection current.

15. The current detection circuit according to claim 1, wherein the first current detection branch comprises an eleventh transistor, a twelfth transistor, and a sixth amplifier, and wherein:
   the eleventh transistor is connected to the signal input terminal, the sixth amplifier, and the switch branch, and the eleventh transistor is configured such that an equivalent resistance of the eleventh transistor is K times an equivalent resistance of the switch branch;
   the sixth amplifier is connected to the eleventh transistor, the twelfth transistor, and the signal output terminal;
   a combination of the sixth amplifier and the twelfth transistor is configured to maintain a voltage at a common terminal of the eleventh transistor and the sixth amplifier equal to a voltage at the signal output terminal, so that a current flowing through a channel of the eleventh transistor is 1/K times the first current, and wherein K is a predetermined parameter derived from transistor sizes and resistance values.

16. The current detection circuit according to claim 15, wherein:
   a first terminal of the eleventh transistor is connected to the switch branch;
   a second terminal of the eleventh transistor is connected to a first input terminal of the sixth amplifier and a third terminal of the twelfth transistor; and
   a third terminal of the eleventh transistor is connected to the signal input terminal.

17. The current detection circuit according to claim 16, wherein the second current detection branch comprises a thirteenth transistor, and wherein:
   a first terminal of the thirteenth transistor is connected to both a second terminal of the thirteenth transistor and the first current detection branch;
   a third terminal of the thirteenth transistor is connected to the signal input terminal; and
   a current flowing through a body diode of the thirteenth transistor is the second detection current, and a sum of the second detection current and a current flowing through a body diode of the eleventh transistor is equal to 1/K times the second current.

18. The current detection circuit according to claim 17, wherein:
   a current flowing through the twelfth transistor is equal to 1/K times the switch branch current.

19. The current detection circuit according to claim 1, wherein the switch branch comprises a fourteenth transistor, and wherein:
   a second terminal and a cathode of a body diode of the fourteenth transistor are connected to the signal output terminal;
   a third terminal and an anode of the body diode of the fourteenth transistor are connected to the signal input terminal;
   the first current is a current flowing through a channel of the fourteenth transistor; and
   the second current is a current flowing through the body diode of the fourteenth transistor.

\* \* \* \* \*